United States Patent
Cione et al.

(10) Patent No.: US 12,432,259 B2
(45) Date of Patent: Sep. 30, 2025

(54) OBTAINING INFORMATION PERTAINING TO A NETWORK FUNCTION IN LAWFUL INTERCEPTION

(71) Applicant: Telefonaktiebolaget LM Ericsson (publ), Stockholm (SE)

(72) Inventors: Domenico Raffaele Cione, Caserta (IT); Elvira Villani, Salerno (IT); Biagio Maione, Naples (IT); Dario De Vito, Mercato San Severino (IT); Daniele Gaito, Naples (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 55 days.

(21) Appl. No.: 18/034,258

(22) PCT Filed: Oct. 28, 2020

(86) PCT No.: PCT/SE2020/051046
§ 371 (c)(1),
(2) Date: Apr. 27, 2023

(87) PCT Pub. No.: WO2022/093085
PCT Pub. Date: May 5, 2022

(65) Prior Publication Data
US 2024/0015187 A1    Jan. 11, 2024

(51) Int. Cl.
*H04L 9/40* (2022.01)
(52) U.S. Cl.
CPC .................................. *H04L 63/306* (2013.01)

(58) Field of Classification Search
CPC ....... H04L 63/20; H04L 63/30; H04L 63/302; H04L 63/304; H04L 63/306
See application file for complete search history.

(56) References Cited

U.S. PATENT DOCUMENTS

| | | | |
|---|---|---|---|
| 9,235,856 B2 * | 1/2016 | Parker | H04L 67/10 |
| 9,860,790 B2 * | 1/2018 | Khan | H04W 40/00 |
| 11,722,982 B2 * | 8/2023 | Shan | H04W 60/00 |
| | | | 370/254 |

(Continued)

FOREIGN PATENT DOCUMENTS

| | | |
|---|---|---|
| WO | 2019/147435 A1 | 8/2019 |
| WO | 2020/143917 A1 | 7/2020 |

OTHER PUBLICATIONS

International Search Report and Written Opinion issued in International Application No. PCT/SE2020/051046 dated May 26, 2021 (12 pages).

(Continued)

*Primary Examiner* — Hosuk Song
(74) *Attorney, Agent, or Firm* — Rothwell, Figg, Ernst & Manbeck, P.C.

(57) ABSTRACT

A lawful interception provisioning function, LIPF (113) and a system information retrieval function, SIRF (114), communicate with each other via the X1 and X2 protocols. The LIPF (113) obtains, from the SIRF (114), information pertaining to a network function, NF(107), which is an instance of a virtual network function, VNF, in a telecommunication network (100), where said information is unrelated to any LI target and any task associated with a point of interception, POI (135), in the NF (107).

20 Claims, 12 Drawing Sheets

(56) References Cited

U.S. PATENT DOCUMENTS

| | | | |
|---|---|---|---|
| 11,757,650 B2* | 9/2023 | Sood | H04L 63/0272 705/51 |
| 11,950,183 B2* | 4/2024 | Kedalagudde | H04L 47/78 |
| 11,962,460 B1* | 4/2024 | Draznin | H04L 67/50 |
| 2023/0135699 A1* | 5/2023 | Liao | H04W 4/50 370/252 |
| 2023/0269591 A1* | 8/2023 | Vitiello | H04W 12/80 455/410 |

OTHER PUBLICATIONS

International Preliminary Report on Patentability issued in International Application No. PCT/SE2020/051046 dated May 26, 2021 (12 pages).

SA3-LI (BT Plc), "Virtualisation Details", 3GPP SADLI#77e-quater, S3120023, e-Meeting, Jun. 2-3, 2020 (11 pages).

SA3-LI (Public Safety Canada), "ADMF descriptive details", 3GPP SA3LI#76, S3i200035, Sophia Antipolis, France, Jan. 2020 (4 pages).

3GPP TS 23.502 V16.3.0 (Dec. 2019), 3rd Generation Partnership Project; Technical Specification Group Services and System Aspects; Procedures for the 5G System (5GS); Stage 2 (Release 16), Dec. 2019 (558 pages).

3GPP TS 29.500 V16.2.1 (Jan. 2020), 3rd Generation Partnership Project; Technical Specification Group Core Network and Terminals; 5G System; Technical Realization of Service Based Architecture; Stage 3 (Release 16), Jan. 2020 (50 pages).

3GPP TS 23.501 V16.3.0 (Dec. 2019), 3rd Generation Partnership Project; Technical Specification Group Services and System Aspects; System architecture for the 5G System (5GS); Stage 2 (Release 16), Dec. 2019 (417 pages).

3GPP TS 33.128 V16.1.0 (Dec. 2019), 3rd Generation Partnership Project; Technical Specification Group Services and System Aspects; Security; Protocol and procedures for Lawful Interception (LI); Stage 3 (Release 16), Dec. 2019 (66 pages).

3GPP TS 33.127 V16.2.0 (Dec. 2019), 3rd Generation Partnership Project; Technical Specification Group Services and System Aspects; Security; Lawful Interception (LI) architecture and functions (Release 16), Dec. 2019 (80 pages).

3GPP TS 29.510 V16.2.0 (Dec. 2019), 3rd Generation Partnership Project; Technical Specification Group Core Network and Terminals; 5G System; Network Function Repository Services; Stage 3 (Release 16), Dec. 2019 (167 pages).

ETSI TS 102 232-1 V3.21.1 (Dec. 2019), Lawful Interception (LI); Handover Interface and Service-Specific Details (SSD) for IP delivery; Part 1: Handover specification for IP delivery, Dec. 2019 (74 pages).

ETSI TS 103 120 V1.5.1 (Mar. 2020), Lawful Interception (LI); Interface for warrant information, Mar. 2020 (70 pages).

ETSI TS 103 221-2 V1.3.1 (Aug. 2020), Lawful Interception (LI); Internal Network Interfaces; Part 2: X2/X3, Aug. 2020 (29 pages).

ETSI TS 103 221-2 V1.2.1 (Dec. 2019), Lawful Interceiption (LI); Internal Network Interfaces; Part 2: X2/X3, Dec. 2019 (28 pages).

ETSI TS 103 221-1 V1.7.1 (Aug. 2020), Lawful Interception (LI); Internal Network Interfaces; Part 1: X1, Aug. 2020 (44 pages).

ETSI TS 103 221-1 V1.6.1 (Dec. 2019), Lawful Interception (LI); Internal Network Interfaces; Part 1: X1, Dec. 2019 (44 pages).

\* cited by examiner

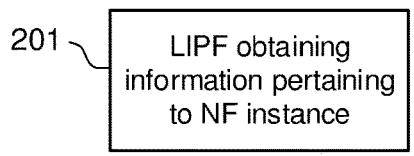
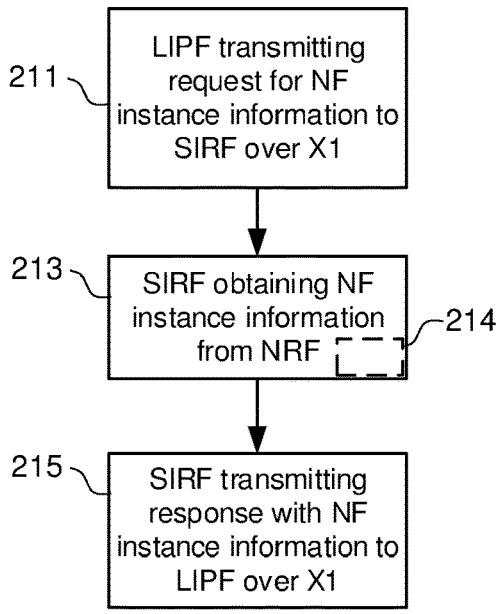
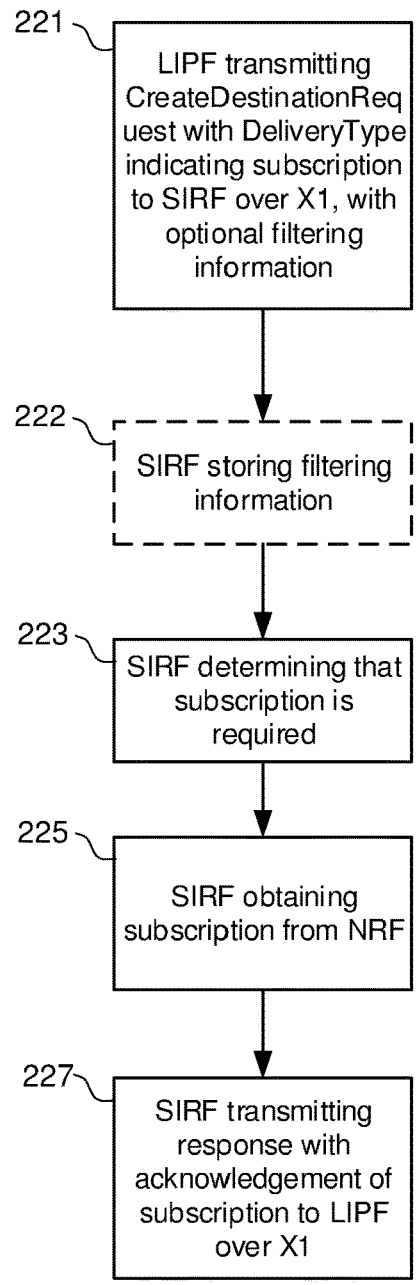
Fig. 2a
Fig. 2b
Fig. 2c

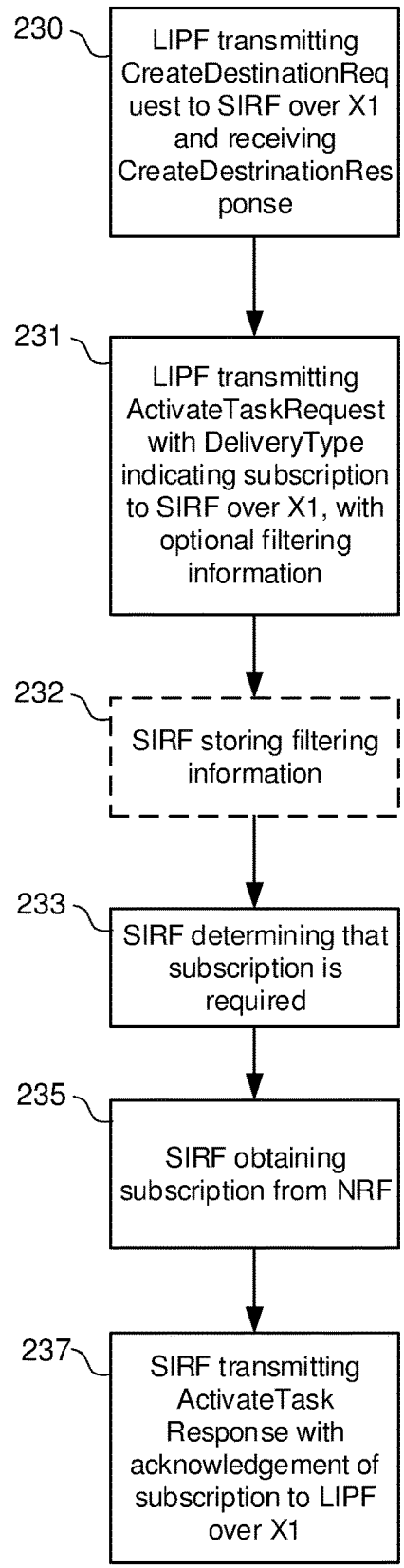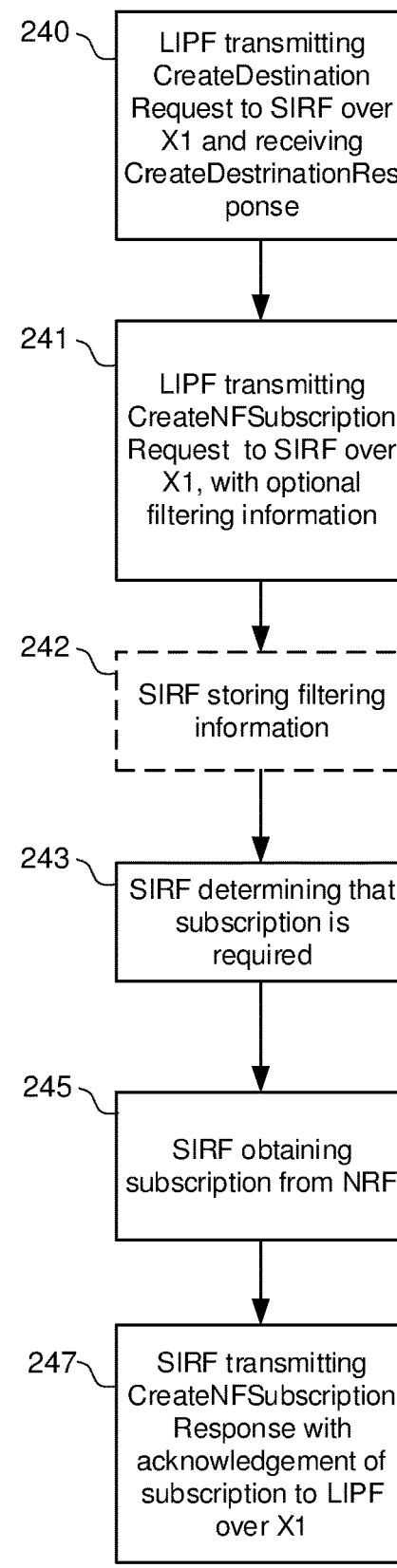
Fig. 2d
Fig. 2e

OBTAINING INFORMATION PERTAINING TO A NETWORK FUNCTION IN LAWFUL INTERCEPTION

CROSS REFERENCE TO RELATED APPLICATIONS

This application is a 35 U.S.C. § 371 National Stage of International Patent Application No. PCT/SE2020/051046, filed 2020 Oct. 28.

TECHNICAL FIELD

The invention relates to a method performed by a computer system hosting at least a lawful interception provisioning function (LIPF) and a system information retrieval function (SIRF) in a telecommunication network, corresponding computer system as well as computer program and carrier of such a computer program.

BACKGROUND

Lawful interception (LI) of traffic between communicating entities in a telecommunication network is subject to standardization work carried out by the $3^{rd}$ Generation Partnership Project (3GPP) and the European Telecommunications Standards Institute (ETSI). The standardization work has reached a stage where the specifications specify functionalities in $5^{th}$ generation (5G) telecommunication system architectures.

The system architecture for a 5G system is defined as a Service-Based Architecture (SBA) by structuring the overall reference model in terms of Network Functions (NF), which in some contexts are denoted Network Element (NE). The interaction between NFs are represented both as "service based" (where any NF within the Control Plane (CP) enables other authorized NFs to access its services) or as "point-to-point" reference points between two NFs.

Specifically, the NF Repository Function (NRF) represents the key functional entity to implement the SBA by providing all NFs with the service discovery function and by maintaining the NF profile of available NF instances and their supported services, remembering that NFs in a 5G context are instances of virtual network functions (VNF).

With specific regard to lawful interception, the LI functional architecture defines LI entities such as Law Enforcement Agency (LEA), Administrative Function (ADMF), Mediation and Delivery Function (MDF) and Law enforcement Monitoring Facility (LEMF) functionalities and interfaces towards the Point of Interception (POI). The POI is modelled as a sub-function of the NF and performs interception and emits LI data for delivery to the LEA via the MDF.

The System Information Retrieval Function (SIRF), which is present in the NRF plays a crucial role to provide ADMF with the system related information for NFs (e.g. service topology). The ADMF, specifically the Lawful Interception Provisioning Function, LIPF, in the ADMF, may request the SIRF for such system related information before sending the intercept provisioning information. Furthermore, the SIRF may notify ADMF (LIPF) whenever the status of a system function changes (e.g. removed from service, migration to another location, etc.).

Interfaces between the LI entities are specified by standardized protocols as defined by ETSI. These Specifications have being updated to support the 5G LI requirements with reference to the administrative data via the X1 interface and the HI1 interface, Intercept Related Information (IRI) and Content of Communication (CC) data via the X2/X3 interfaces and the HI2/HI3 interfaces.

The X1 reference model is structured to provide communication between two entities acting as controlling function, such as a Communication Service Provider (CSP) ADMF, and as controlled function, such as an NF performing interception or mediation or delivery.

X1 messages are defined in the specifications to manage primary data at level of "Task" and "Destination" to/from NFs entities owing POIs. Specifically, a command is sent from ADMF to NF as a "task" (e.g. activate, modify and deactivate task) which relates to a single target identifier (noting that a "target" denotes an entity that is a subject of the actual interception).

A "Task" on X1 is uniquely identified by an X1 Identifier (XID) and it is handled independently of all other tasks. The ADMF will assign the XID and it is responsible for correlating the XID to any LI instance identifier used to communicate with the LEA. X1 messages on a "Destination" are used to notify NE/NFs with the identities of the receivers of the intercepted traffic from POIs. Each "Destination" is uniquely identified by a Destination Identifier (DID) and is handled independently from details of the "Task". Each "Task" is associated with one or more "Destinations". The "Destination" can be created and modified using a specific message and it is related to X2 and X3 Delivery Type.

Furthermore, the X1 interface specification also covers reporting issues from NF to ADMF as a spontaneous notification to a specific destination manually provided at the time of NE configuration (e.g. at installation and network maintenance points in time).

The X2/X3 interface specifies the protocol format of the intercepted data from the NF POI to the MDF as a stream of X2/X3 Protocol Data Units (PDU). Each X2/X3 PDU consists of three main sections: a set of mandatory header fields containing identifiers, routing and correlation information; a set of additional optional attributes conveying additional metadata about the intercepted material; and a copy of the intercepted material. This X2/X3 data is basically "Task" related so that the XID is a mandatory header field of X2/X3 PDU. The POI will populate this XID field with the XID associated with the intercepted product, as assigned by the relevant X1 interface.

In the current development work of the 3GPP standard specifications, the interface between SIRF/NRF and LIPF/ADMF (i.e. the LI_SI interface) has been only defined at an architectural level and details for this interface at stage 3 level have not been covered. Furthermore, the current ETSI X standard interfaces are task oriented in that they impose a definition of an XID value over the X1 interface to be sent also over X2 and X3 interfaces for uniquely identifying the target and the related intercepted X2 and X3 traffic. The current X1 standard specification is ETSI 103 221-1 V1.7.1 and the current X2 standard specification is ETSI 103 221-2 V1.3.1.

SUMMARY

In view of the above, an object of the present disclosure is to overcome drawbacks related to the LI_SI interface between the SIRF/NRF and the LIPF/ADMF. This object is achieved in a first aspect by a method performed by a computer system in a telecommunication network, the computer system hosting at least a LIPF and a SIRF. The method of the first aspect comprises obtaining, by the LIPF from the SIRF, information pertaining to a NF that is an instance of a VNF in the telecommunication network, where said information is unrelated to any LI target associated with a POI in the NF. For example, the obtaining of information pertaining to a NF may comprise receiving information pertaining to a plurality of NF instances. Furthermore, the obtaining of information pertaining to a NF may comprise obtaining a subscription to receiving notifications of status changes of at least one NF instance. Moreover, the obtaining of information pertaining to a NF may comprise receiving at least one notification of a status change of an NF instance.

In other words, such a method provides an advantageous extension of existing specifications. That is, such a method provides support of 5G traffic scenarios where the exchanged data between NFs and LIPF/ADMF is non-target related. Furthermore, such a method provides a way to avoid loss of information about all the NFs that have been instantiated as VNFs for a given specific target user's service in a 5G network. Also, such a method facilitates managing of new NF services to be configured and on-boarded automatically in a VNF environment or in a 5G native cloud architecture.

As will be exemplified in the following, the method provides these advantages by re-using security and protocol definitions offered by ETSI X interface standard specifications already available for target related services. The method advantageously re-uses existing ETSI X1 and X2 interfaces and the interface for the communication between NRF and SIRF by introducing no or minimum impacts in terms of modifications while keeping backward compatibility.

For example, the obtaining of information pertaining to a NF may comprise transmitting, from the LIPF to the SIRF over an X1 interface as specified in technical specification 103 221-1 V1.7.1 by ETSI, a request that comprises a RequestMessageType having a value that indicates a request for information pertaining to a plurality of NF instances. The SIRF then obtains, from an NRF, the information pertaining to a plurality of NF instances and comprising an identifier of each NF instance. A response that comprises the information pertaining to a plurality of NF instances is then transmitted, from the SIRF to the LIPF over the X1 interface.

The obtaining of information pertaining to a NF may also or alternatively comprise transmitting, from the LIPF to the SIRF over the ETSI X1 interface, a CreateDestinationRequest message that comprises a DeliveryType having a value that indicates a request for the subscription to receiving notifications of status changes of NF instances. The SIRF then determines, based at least on the DeliveryType value, that a subscription to receiving notifications of status changes of NF instances is required by the LIPF. The SIRF then obtains, from the NRF, the subscription to receiving notifications of status changes of NF instances. A CreateDestinationResponse message comprising a positive acknowledgment of the obtained subscription is then transmitted from the SIRF to the LIPF over the X1 interface.

The obtaining of information pertaining to a NF may also or alternatively comprise transmitting, from the LIPF to the SIRF over the ETSI X1 interface, an ActivateTaskRequest message that comprises a DeliveryType having a value that indicates a request for the subscription to receiving notifications of status changes of NF instances. The SIRF then determines, based at least on the DeliveryType value, that a subscription to receiving notifications of status changes of NF instances is required by the LIPF. The SIRF then obtains, from the NRF, the subscription to receiving notifications of status changes of NF instances. An ActivateTaskResponse message comprising a positive acknowledgment of the obtained subscription is then transmitted from the SIRF to the LIPF over the X1 interface.

The obtaining of information pertaining to a NF may also or alternatively comprise transmitting, from the LIPF to the SIRF over the ETSI X1 interface, a CreateNFSubscriptionRequest message that indicates a request for the subscription to receiving notifications of status changes of NF instances. The SIRF then obtains, from the NRF, the subscription to receiving notifications of status changes of NF instances. A CreateNFSubscriptionResponse message comprising a positive acknowledgment of the received subscription is then transmitted from the SIRF to the LIPF over the X1 interface.

Having obtained a subscription to receiving notifications of status changes of the NF instance, the SIRF may then receive, from the NRF, at least one notification of a status change of an NF instance. The SIRF then transmits, to the LIPF over the X2 interface as specified in technical specification 103 221-2 V1.3.1 by the ETSI, a PDU that specifies the at least one notification of a status change of an NF instance.

Prior to transmitting such a PDU, the SIRF may reading stored filtering information that specifies how notifications of status changes of the NF instance are to be selected for the transmission to the LIPF. The transmitting of the PDU is then performed depending on the filtering information. The filtering information may comprise any of an identifier of an NF instance, NF instance type, NF instance status change type, and NF instance profile information.

In a further aspect, there is provided a computer system comprising at least a processor and a memory, the memory containing instructions executable by the processor whereby the computer system is operative to perform a method as summarized above.

In yet a further aspect, there is provided a computer program comprising instructions which, when executed on at least one processor in a computer system, cause the computer system to carry out a method as summarized above.

In yet a further aspect, there is provided a carrier, comprising the computer program as summarized above, wherein the carrier is one of an electronic signal, an optical signal, a radio signal and a computer readable storage medium.

These further aspects and embodiments of these further aspects provide the same effects and advantages as summarized above in connection with the method of the first aspect.

BRIEF DESCRIPTION OF THE DRAWINGS

FIGS. 2a-j are flowcharts of methods,

DETAILED DESCRIPTION

The service-based architecture (SBA) that has been introduced in the standardization of 5G defines NF instances dynamically and the information are stored in the NRF service. In order to take advantage and automatize the configuration of the POI in LI management, a new interface between LIPF/ADMF and SIRF/NRF is described herein. Three main functions and related protocols are disclosed that handle dynamic NF instances and the corresponding POI for LI management: 1) Query and retrieval of the NF instances list, 2) Subscription to NF instance Notification, and 3) Notification of NF instances status (e.g. registered/updated/deregistered) change.

Currently, the ETSI X1, X2 and X3 interfaces are only referred to the POIs and to the intercepted cases handling between the ADMF and the NEs/NFs. That is, current X1 and X2 (and X3) interfaces relate only to targets and tasks in the LI context whereas the present disclosure exemplifies re-use of X1 and X2 interfaces that are already in place for any NF instance.

Figure 1A:
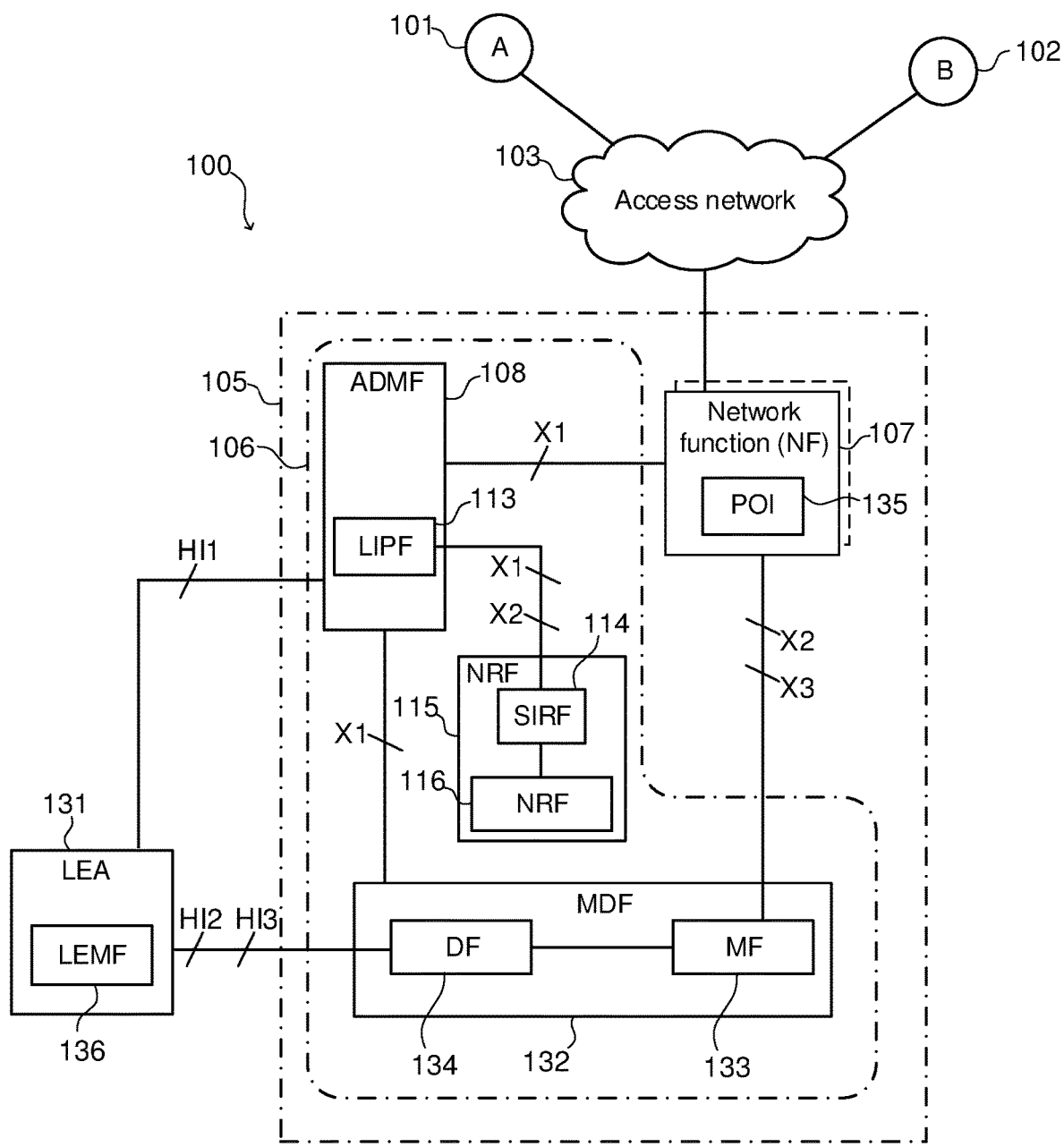
FIGS. 1a-b are schematically illustrated block diagrams of LI systems.

FIG. 1a exemplifies a node level architecture of the relevant entities' interfaces in a LI context. A telecommunication network 100 comprises a core network 105 and an access network 103 in which two communicating entities, a first communicating entity 101 and a second communicating entity 102 are connected. The access network may, e.g., be in the form of a 3GPP radio access network (RAN) or any other type of non-3GPP communication network that may connect to the core network 105.

As the skilled person will realize, communication performed by the first and second communicating entities 101, 102 is enabled by several functional units in both the access network 103 and the core network 105. For the sake of clarity of description, such functional units are not illustrated in full but only schematically represented and exemplified by a network function (NF) 107 that, in a 4G context, may be a mobility management entity (MME), a serving gateway (S-GW), a packet data network gateway (P-GW) etc. In a 5G context, the network function 107 may, e.g., be in the form of a policy control function (PCF), a user data management function (UDM), an Access and Mobility Management Function (AMF) or a session management function (SMF) etc. The network function 107 may even be an SMS-Function (SMSF). A common characteristic of such functional units, as represented by network function 107, in the core network 105 is that they may comprise LI functionality in the form of a point of interception (POI) 135. The POI 135 is in FIG. 1a thus depicted as being a part of the network function 107 or being embedded therein, but the POI 135 may also be separate from the network function 107 with which it is associated. The core network 105 may be the core network of a serving network (SN), which may be a Visited Public Land Mobile Network (VPLMN) or a Home Public Land Mobile Network (HPLMN).

The core network 105 also comprises an administrative function (ADMF) 108, a network function repository function (NRF) 115 and a mediation and delivery function (MDF) 132 comprising a mediation function (MF) 133 and a delivery function (DF) 134. The MF 133 is configured to handle an intercept product in the form of intercept related information (IRI) and content of communication (CC) received from the POI 135 and the DF 134 is configured to provide the IRI and CC to the LEA 131. The LEA 131 manages a law enforcement monitoring facility (LEMF) 136, which receives IRI and CC from the MDF 132. The ADMF 108 comprises a LIPF 113 and the NRF 115 comprises a system information retrieval function (SIRF) 114 and an NRF function 116.

As mentioned above, communication between the entities takes place via X1, X2 and X3 interfaces. That is, the ADMF 108 communicates with the MF 133, DF 134 and the POI 135 in the NE 107 via the X1 interface. The POI 135 in the NE 107 communicates with the MF 133 via the X2 and X3 interfaces. The ADMF 108 also communicates with the LEA 131 via an HI1 interface and the DF 134 communicates with the LEMF 136 in the LEA 131 via HI2 and HI3 interfaces.

Figure 1B:
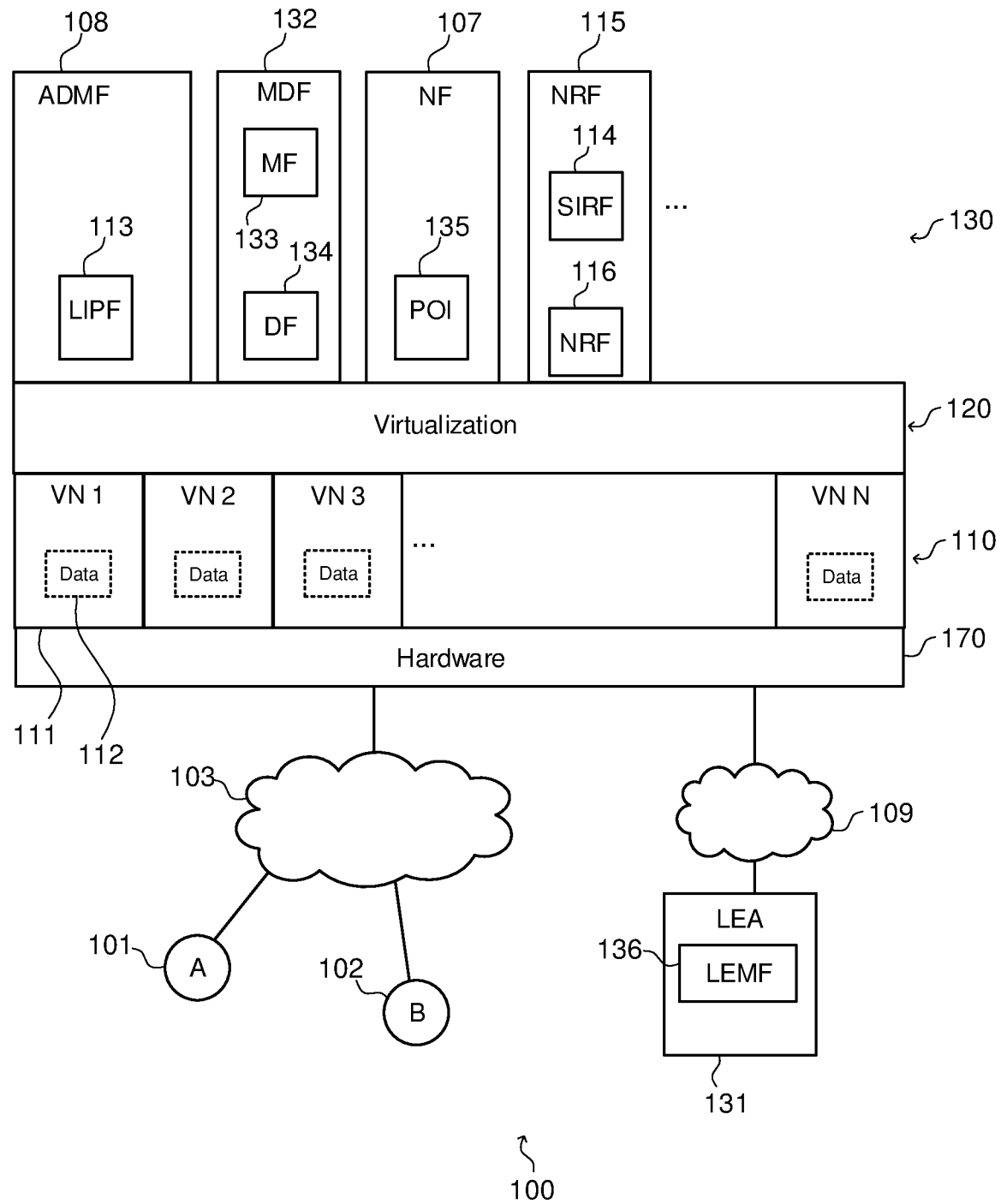

FIG. 1b schematically illustrates a second functional representation of the telecommunication network 100. In this second functional representation, the telecommunication network 100 is realized at least in part by virtualized functions that are executed on virtual nodes 110 that utilize a hardware server platform 170. The ADMF 108 with its LIPF 113, the MDF 132 with its MF 133 and DF 134, the NF 107 with the POI 135, and the NRF 115 with its SIRF 114 and the NRF 116 are realized in a functional layer 130 of virtualized network functions (VNF) that execute in the virtual nodes 110 on hardware 170 in the form of, e.g. a computer system, via a virtualization layer 120. For example, a virtual node 111 is a collection of software instructions as well as associated data 112 as the skilled person will realize. The LEA 131 with its LEMF 136 is connected to the hardware 170 via an intermediate network 109, the details of which are outside the scope of the present disclosure. Although not explicitly illustrated in FIG. 1b, communication between entities via the X1, X2, X3, HI1, HI2 and HI3 interfaces take place as described above in connection with FIG. 1a.

Turning now to FIGS. 2a-j, FIGS. 3a-e and FIG. 4, and with continued reference to FIGS. 1a-b, embodiments of methods in the telecommunication network 100 will be described in some more detail. The embodiments will exemplify how the various functional units and interfaces described above may be extended or enhanced in order to provide the effect and advantages associated with communication between the LIPF/ADMF 113 and the SIRF/NRF 114.

As briefly mentioned above, extending the ETSI X1 interface and the ETSI X2 interface highly simplifies the definition of the new procedures described herein and provided re-use of all the security and the protocol definition already available for any service (such as transport layer security (TLS) certificate handling, ping, keepalive, issue reporting, etc.). The LIPF 113 has to know only the address of the SIRF 114 and the LIPF 113 uses the information to connect to their X1 interfaces and according to the standard receives the information on the X2 end-points in order to complete the connection.

FIG. 2a illustrates a method that comprises actions performed by a computer system 400 in a telecommunication network 100. The computer system 400 hosts at least a LIPF 113 and a SIRF 114. The method comprises actions as follows:

Action 201

The LIPF 113 obtains, from the SIRF 114, information pertaining to a NF 107, the NF 107 being an instance of a VNF in the telecommunication network 100. The information obtained by the LIPF 113 from the SIRF 114 is unrelated to any LI target associated with a POI 135 in the NF 107.

For example, the obtaining 201 may comprise receiving information pertaining to a plurality of NF instances. In other examples, the obtaining 201 may comprise obtaining a subscription to receiving notifications of status changes of at least one NF instance. In other examples, the obtaining 201 may comprise receiving at least one notification of a status change of an NF instance.

FIG. 2b illustrates examples wherein the obtaining in action 201 comprises receiving information pertaining to a plurality of NF instances. Such examples of methods comprise actions as follows:

Action 211

The LIPF 113 transmits to the SIRF 114 over an X1 interface as specified in technical specification 103 221-1

V1.7.1 by the European Telecommunications Standards Institute, ETSI, a request that comprises a RequestMessageType having a value that indicates a request for information pertaining to a plurality of NF instances.

Action 213

The SIRF 114 obtains from the NRF 116 the information pertaining to a plurality of NF instances and comprising an identifier of each NF instance.

Action 215

The SIRF 114 transmits to the LIPF 113 over the X1 interface a response that comprises the information pertaining to a plurality of NF instances.

For example, the obtaining in action 213 may comprise, as exemplified by an action 214, obtaining profile information pertaining to each NF instance, and the transmitting in action 215 may comprise transmitting the information pertaining to each NF instance.

Figure 3A:
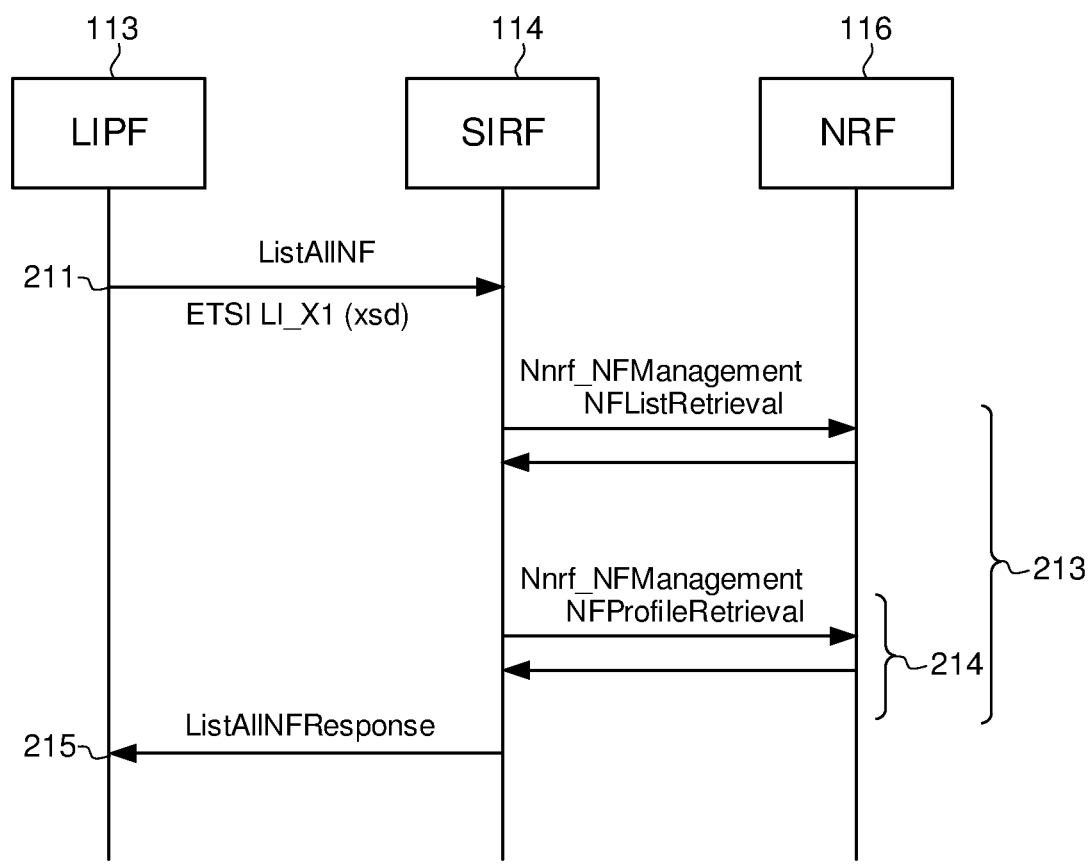
FIGS. 3a-e are signaling diagrams illustrating signals transmitted in the methods illustrated in FIGS. 2a-j, FIG. 4 schematically illustrates a computer system, and FIG. 5 schematically illustrates a computer system.

Such methods provide extensions to the X1 interface with two new structures for querying and retrieving all registered NFs in a 5G network, necessary for the LIFP 113 in an initialization phase and whenever the LIPF 113 needs to re-synchronize the current list of registered NFs (for example due to possible loss of NF notifications for a network unavailability). Specifically, as illustrated in FIG. 3a, the request transmitted in action 211 may be done through ListAllNF, a new RequestMessageType in ETSI X1. The relative xsd may then appear as follows:

```
<xs:simpleType name="RequestMessageType">
    <xs:restriction base="xs:string">
        <xs:enumeration value="ActivateTask"/>
        <xs:enumeration value="ModifyTask"/>
        <xs:enumeration value="DeactivateTask"/>
        <xs:enumeration value="DeactivateAllTasks"/>
        <xs:enumeration value="GetTaskDetails"/>
        <xs:enumeration value="CreateDestination"/>
        <xs:enumeration value="ModifyDestination"/>
        <xs:enumeration value="RemoveDestination"/>
        <xs:enumeration value="RemoveAllDestinations"/>
        <xs:enumeration value="GetDestinationDetails"/>
        <xs:enumeration value="GetNEStatus"/>
        <xs:enumeration value="GetAllDetails"/>
        <xs:enumeration value="ListAllDetails"/>
        <xs:enumeration value="ReportTaskIssue"/>
        <xs:enumeration value="ReportDestinationIssue"/>
        <xs:enumeration value="ReportNEIssue"/>
        <xs:enumeration value="Ping"/>
        <xs:enumeration value="Keepalive"/>
        <xs:enumeration value="ListAllNF"/>
    </xs:restriction>
</xs:simpleType>
```

The action 213 by the SIRF 114 of obtaining from the NRF 116 the information pertaining to a plurality of NF instances and comprising an identifier of each NF instance may comprise, as illustrated in FIG. 3a, a sequence of transmissions by the SIRF 114 and the NRF 116. Specifically, the SIRF 114 may use the Nnrf_NFManagement, in particular the application programming interface (API) NFListRetrieval, as specified in the 3GPP standard specification 29.510 V16.2.0, to get the URIList of all registered NFs.

The action 214 by the SIRF 114 of obtaining profile information pertaining to each NF instance may comprise, as illustrated in FIG. 3a, a further sequence of transmissions by the SIRF 114 and the NRF 116 to retrieve the profile of each of registered NFs through the API NFProfileRetrieval (as specified in the 3GPP standard specification 29.510 V16.2.0).

The SIRF 114 may compose the response and transmit, as illustrated by action 215, back to LIPF 113 the list of NFs with all needed information obtained from NFs profiles through a ListAllNFResponse. The relative xsd will appear as follows:

```
<xs:complexType name="ListAllNFResponse">
    <xs:complexContent>
        <xs:extension base="X1ResponseMessage">
            <xs:sequence>
                <xs:element name="NFDetails" type="NFDetails"/>
            </xs:sequence>
        </xs:extension>
    </xs:complexContent>
</xs:complexType>
```

The NFDetails structure may be composed with all needed information for LI provisioning, such as the NF identity (NFID), NF type, internet protocol (IP) Addresses and Fully Qualified Domain Name (FQDN).

FIG. 2c illustrates examples wherein the obtaining in action 201 comprises obtaining a subscription to receiving notifications of status changes of at least one NF instance. Such examples of methods comprise actions as follows:

Action 221

The LIPF 113 transmits 221 to the SIRF 114 over an X1 interface as specified in technical specification 103 221-1 V1.7.1 by the ETSI, a CreateDestinationRequest message that comprises a DeliveryType having a value that indicates a request for the subscription to receiving notifications of status changes of NF instances.

The CreateDestinationRequest message may comprise Destination DetailsExtensions comprising filtering information that specifies how notifications of status changes of the NF instances are to be selected for transmission to the LIPF. In such cases, the method comprises an action 222 that comprises storing, by the SIRF 114, the filtering information.

Action 223

The SIRF 114 determines, based at least on the DeliveryType value received in action 221, that a subscription to receiving notifications of status changes of NF instances is required by the LIPF 113.

Action 225

The SIRF 114 obtains from the NRF 116 the subscription to receiving notifications of status changes of NF instances. That is, this obtaining action is performed as a consequence of the determination in the previous action.

Action 227

The SIRF 114 transmits to the LIPF 113 over the X1 interface, a CreateDestinationResponse message comprising a positive acknowledgment of the obtained subscription.

As an alternative to using a CreateDestinationRequest message in order to obtain a subscription to notifications of status changes of the NF instances, such subscriptions may be obtained by the SIRF 114 as illustrated in FIG. 2d, comprising the following actions:

Action 230

In order to obtain a destination where subsequent notifications of status changes of NF instances, the LIPF 113 and the SIRF 114 exchanges over the X1 interface as specified in technical specification 103 221-1 V1.7.1 by the ETSI, CreateDestinationRequest and CreateDestinationResponse messages.

Action 231

The LIPF 113 transmits to the SIRF 114 over the X1 interface an ActivateTaskRequest message that comprises a DeliveryType having a value that indicates a request for the subscription to receiving notifications of status changes of NF instances.

The ActivateTaskRequest message may comprise TaskDetailsExtensions comprising filtering information that specifies how notifications of status changes of the NF instances are to be selected for transmission to the LIPF. In such cases, the method comprises an action 232 that comprises storing, by the SIRF 114, the filtering information.

Action 233

The SIRF 114 determines, based at least on the DeliveryType value, that a subscription to receiving notifications of status changes of NF instances is required by the LIPF 113.

Action 235

The SIRF 114 obtains from the NRF 116 the subscription to receiving notifications of status changes of NF instances. That is, this obtaining action is performed as a consequence of the determination in the previous action.

Action 237

The SIRF 114 transmits, to the LIPF 113 over the X1 interface, an ActivateTaskResponse message comprising a positive acknowledgment of the obtained subscription.

A further alternative to using a CreateDestinationRequest message or an ActivateTaskRequest message in order to obtain a subscription to notifications of status changes of NF instances is illustrated in FIG. 2e. Such a method comprises actions as follows:

Action 240

In order to obtain a destination where subsequent notifications of status changes of NF instances, the LIPF 113 and the SIRF 114 exchanges over the X1 interface as specified in technical specification 103 221-1 V1.7.1 by the ETSI, CreateDestinationRequest and CreateDestinationResponse messages.

Action 241

The LIPF 113 transmits to the SIRF 114 over the X1 interface a CreateNFSubscriptionRequest message that indicates a request for the subscription to receiving notifications of status changes of NF instances.

The CreateNFSubscriptionRequest message may comprise CreateNFSubscriptionExtensions comprising filtering information that specifies how notifications of status changes of the NF instances are to be selected for transmission to the LIPF. In such cases, the method comprises an action 242 that comprises storing, by the SIRF 114, the filtering information.

It is to be noted that the name CreateNFSubscriptionRequest of the message and the name CreateNFSubscriptionExtensions are only examples that represent additions of a new message to the X1 specification and they may be exchanged with other suitable names other than names already specified in the standard specifications.

Action 243

The SIRF 114 determines, based on the CreateNFSubscriptionRequest, that a subscription to receiving notifications of status changes of NF instances is required by the LIPF 113.

Action 245

The SIRF 114 obtains, from the NRF 116, the subscription to receiving notifications of status changes of NF instances. That is, this obtaining action is performed as a consequence of the determination in the previous action.

Action 247

The SIRF 114 transmits to the LIPF 113 over the X1 interface, a CreateNFSubscriptionResponse message comprising a positive acknowledgment of the received subscription.

It is to be noted that the name CreateNFSubscriptionResponse of the message is only an example that represent an addition of a new message to the X1 specification and it may be exchanged with another suitable name other than names already specified in the standard specifications.

The filtering information received by the SIRF 114 may comprises any of an identifier of an NF instance, NF instance type, NF instance status change type, and NF instance profile information.

Having obtained a subscription to receiving notifications of status changes of at least one NF instance, it may at some point be necessary to terminate such a subscription. Actions performed in such a procedure are exemplified herein with reference to FIG. 2f:

Action 251

The LIPF 113 transmits to the SIRF 114 over the X1 interface as specified in technical specification 103 221-1 V1.7.1 by the ETSI, a RemoveDestinationRequest message that comprises an identifier of a destination.

Action 253

The SIRF 114 determines based at least on the identifier of the destination in the RemoveDestinationRequest message transmitted by the LIPF 113 to the SIRF 114 in action 251 that there exists a subscription, i.e. that a subscription has been obtained.

Action 255

The SIRF 114 transmits to the NRF 116, a request to delete the subscription. That is, this transmission action is performed as a consequence of the determination in the previous action.

Action 257

The SIRF 114 transmits to the LIPF 113 over the X1 interface, a RemoveDestinationResponse message comprising a positive acknowledgment of the terminated subscription.

Figure 2F:
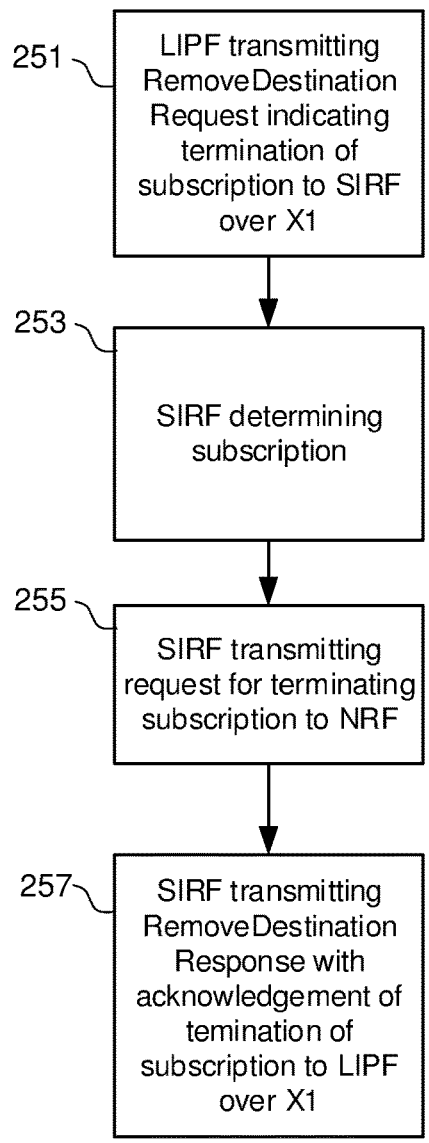
Figure 2G:
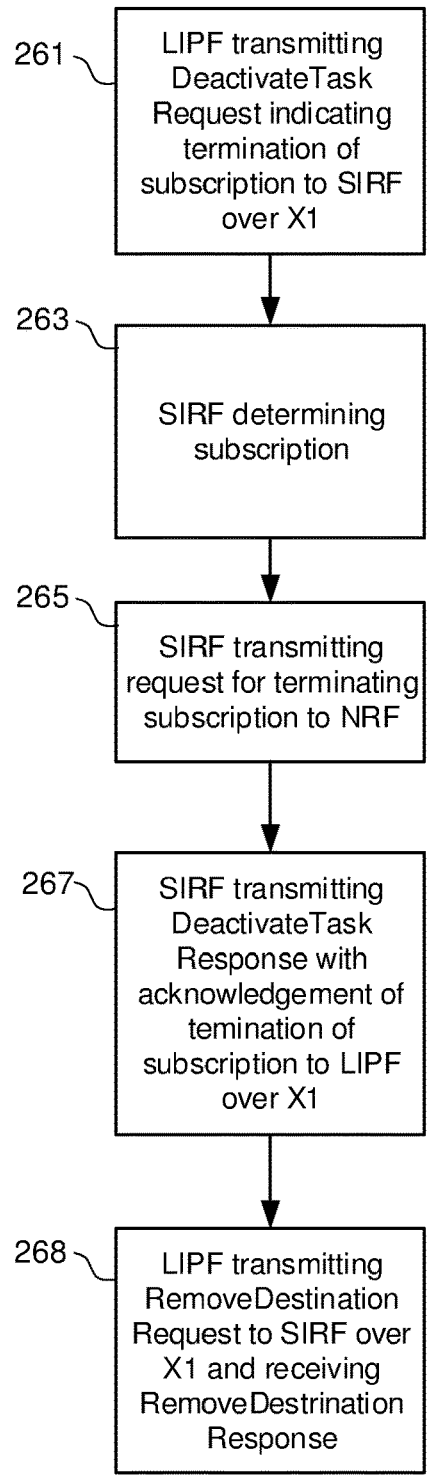

As an alternative to using, by the LIPF 113, a RemoveDestinationRequest message to terminate a subscription to notifications of status changes of the NF instances, subscription termination may be performed as illustrated in FIG. 2g, comprising the following actions:

Action 261

The LIPF 113 transmits to the SIRF 114 over an X1 interface as specified in technical specification 103 221-1 V1.7.1 by the ETSI, a DeactivateTaskRequest message that comprises a task identifier.

Action 263

The SIRF 114 determines based at least on the task identifier in the DeactivateTaskRequest message transmitted from the LIPF 113 to the SIRF 114 in action 261 that there exists a subscription, i.e. that a subscription has been obtained.

Action 265

The SIRF 114 transmits to the NRF 116, a request to delete the subscription. That is, this transmission action is performed as a consequence of the determination in the previous action.

Action 267

The SIRF 114 transmits to the LIPF 113 over the X1 interface, a DeactivateTaskResponse message comprising a positive acknowledgment of the terminated subscription.

Action 268

The procedure of terminating the subscription concludes in that the LIPF 113 and the SIRF 114 exchanges over the X1 interface, RemoveDestinationRequest and RemoveDestinationResponse messages with respect to the destination created in action 230.

Figure 2H:
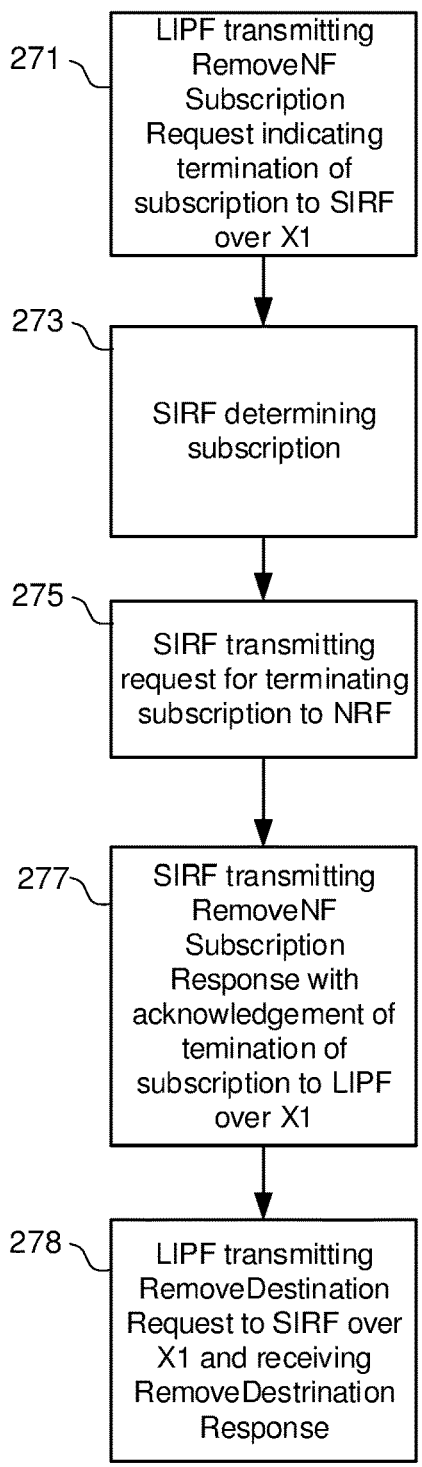
Figure 2I:
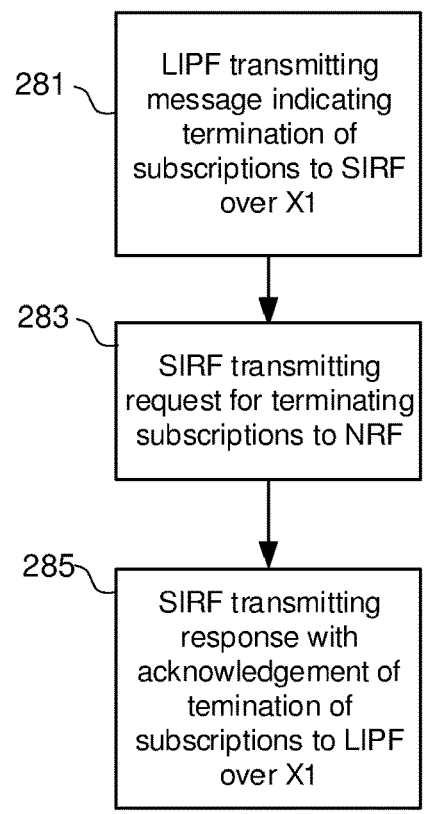

A further alternative to using, by the LIPF 113, a RemoveDestinationRequest message to terminate a subscription to notifications of status changes of the NF instances, subscription termination may be performed as illustrated in FIG. 2h, comprising the following actions:

Action 271

The LIPF 113 transmits to the SIRF 114 over an X1 interface as specified in technical specification 103 221-1 V1.7.1 by the ETSI, a RemoveNFSubscriptionRequest message.

Action 273

The SIRF 114 determines based on the RemoveNFSubscriptionRequest message that there exists a subscription, i.e. that a subscription has been obtained.

Action 275

The SIRF 114 transmits to the NRF 116, a request to delete the subscription. That is, this transmission action is performed as a consequence of the determination in the previous action.

Action 277

The SIRF 114 transmits to the LIPF 113 over the X1 interface, a RemoveNFSubscriptionResponse message comprising a positive acknowledgment of the terminated subscription.

Action 278

The procedure of terminating the subscription concludes in that the LIPF 113 and the SIRF 114 exchanges over the X1 interface, RemoveDestinationRequest and RemoveDestinationResponse messages with respect to the destination created in action 240.

It is to be noted that the names RemoveNFSubscriptionRequest and RemoveNFSubscriptionResponse are only examples that represent additions to the ETSI X1 specification and they may be exchanged with other suitable names other than names already specified in the standard specifications.

Instead of terminating individual subscriptions, as exemplified in FIG. 2f, FIG. 2g and FIG. 2h, all subscriptions may be unconditionally terminated. Such a procedure comprises actions exemplified with reference to FIG. 2i:

Action 281

The LIPF 113 transmits to the SIRF 114 over the X1 interface as specified in technical specification 103 221-1 V1.7.1 by the ETSI, any of a RemoveAllDestinationsRequest message or a DeactivateAllTasksRequest message or a RemoveAllNFSubscriptions message.

Similar to the note above, the name RemoveAllNFSubscriptions is only an example that represents an addition of a new message to the X1 specification and it may be exchanged with another suitable name other than a name already specified in the standard specifications.

Action 283

The SIRF 114 transmits to the NRF 116, a request to delete all subscriptions to receiving notifications of status changes of NF instances.

Action 285

The SIRF 114 transmits to the LIPF 113 over the X1 interface, a message comprising a positive acknowledgment of the terminated subscription.

Following actions 281 to 285, in case transmission has been made from the LIPF 113 to the SIRF 114 of a DeactivateAllTasksRequest message or a RemoveAllNFSubscriptions message, then one or more RemoveDestination messages or a RemoveAllDestinations message may be transmitted via X1 from the LIPF 113 to the SIRF 114.

The methods exemplified in FIG. 2c and FIG. 2f provide examples of extensions to the X1 interface. Specifically, the ETSI X1 CreateDestinationRequest message (for example with Delivery Type="system info") may be used not only to specify where to send notifications, but also to trigger the SIRF 114 to subscribe to NFinstance Notification (for getting info about NF registration, update and de-registration). That is, as illustrated in FIG. 3b, the SIRF 114, once it has received a first CreateDestinationRequest command on ETSI X1 interface transmitted in action 221 from the LIPF 113, may subscribe to NRF as NF service consumer using Nnrf_NFManagement as specified in the 3GPP standard specification 29.510 V16.2.0, handling the subscription data, acting on behalf of the LIPF 113.

The SIRF 114 is able to determine that it has received the first CreateDestinationRequest message by determining that it has not received a previous CreateDestinationRequest message having a Delivery Type="system info". For example, such a determination may be done by the SIRF 114 by keeping track of destination identifiers in CreateDestinationRequest messages having Delivery Type="system info".

Figure 3B:
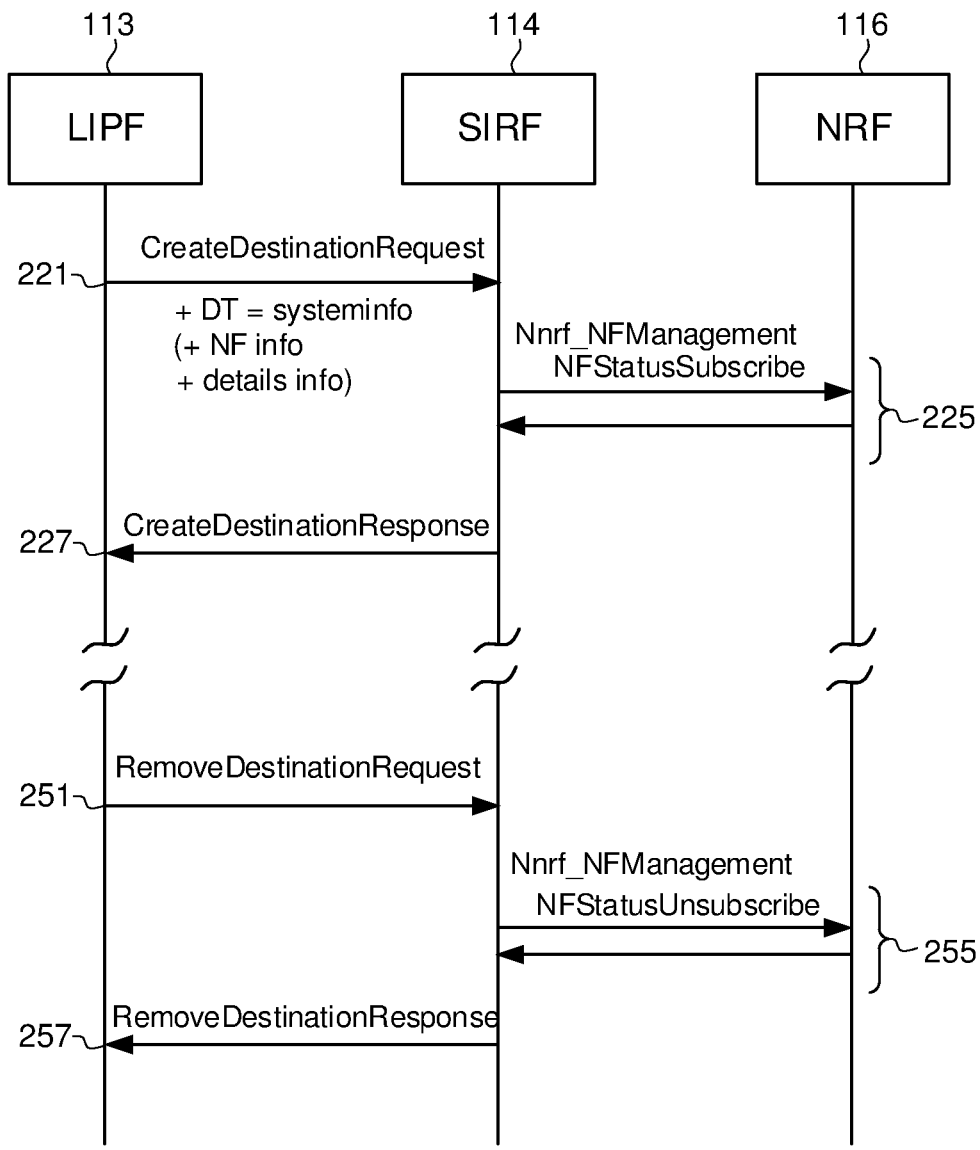

The action 225 by the SIRF 114 of obtaining, from the NRF 116, the subscription to receiving notifications of status changes of NF instances may comprise, as illustrated in FIG. 3b, a sequence of transmissions by the SIRF 114 and the NRF 116. The response from the NRF 116 (accepted or rejected subscription), may then be done through the CreateDestinationResponse message transmitted by the SIRF 114 to the LIPF 113 on ETSI X1 as illustrated by action 227.

As illustrated in FIG. 3b, in action 251, the ETSI X1 RemoveDestinationRequest message referring to a last "system info" Destination triggers the unsubscription of SIRF to NFInstance Notifications. That is, the action 255 by the SIRF 114 of removes the subscription and it may comprise, as illustrated in FIG. 3b, a sequence of transmissions by the SIRF 114 and the NRF 116 according to Nnrf_NFManagement. The response from the NRF 116 that the subscription has been removed may then be done through the RemoveDestinationResponse message transmitted by the SIRF 114 to the LIPF 113 on ETSI X1 as illustrated by action 257.

The SIRF 114 is able to determine that it has received the RemoveDestinationRequest message referring to the last "system info" Destination by keeping track of destination identifiers in CreateDestinationRequest messages having Delivery Type="system info".

The methods exemplified in FIG. 2d and FIG. 2g provide further examples of extensions to the X1 interface. Specifically, the ETSI X1 ActivateTaskRequest message (for example with Delivery Type="system info") may be used to trigger the SIRF 114 to subscribe to NFinstanceNotification (for getting info about NF registration, update and de-registration). However, in contrast to the examples using the CreateDestinationRequest message, in the examples using the ActivateTaskRequest message, an initial sequence of CreateDestinationRequest and CreateDestinationResponse over X1 between the LIPF 113 and the SIRF 114 should be performed. That is, as illustrated in FIG. 3c, initially the SIRF 114, the LIPF 113 and the SIRF 114 exchanges over the X1 CreateDestinationRequest and CreateDestinationResponse messages as exemplified by action 230.

Once the SIRF 114 has received a first ActivateTaskRequest on ETSI X1 interface transmitted in action 231 from the LIPF 113, it may subscribe to NRF as NF service consumer using Nnrf_NFManagement as specified in the 3GPP standard specification 29.510 V16.2.0, handling the subscription data, acting on behalf of the LIPF 113.

The SIRF 114 is able to determine that it has received the first ActivateTaskRequest message by determining that it has not received a previous ActivateTaskRequest message having a Delivery Type="system info". For example, such a determination may be done by the SIRF 114 by keeping track of destination identifiers in ActivateTaskRequest messages having Delivery Type="system info".

Figure 3C:
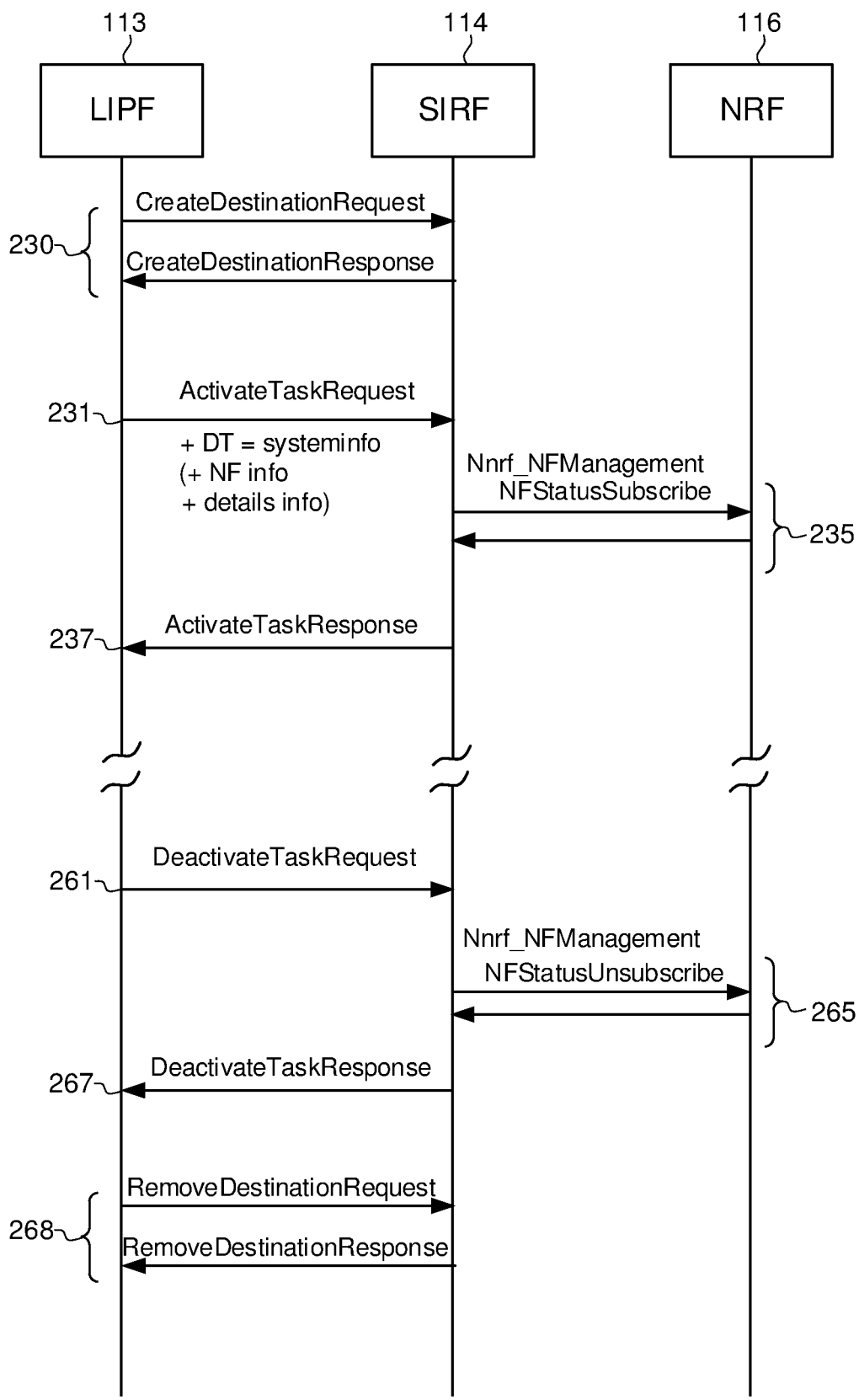

The action 235 by the SIRF 114 of obtaining, from the NRF 116, the subscription to receiving notifications of status changes of NF instances may comprise, as illustrated in FIG. 3c, a sequence of transmissions by the SIRF 114 and the NRF 116. The response from the NRF 116 (accepted or rejected subscription), may then be done through the ActivateTaskResponse message transmitted by the SIRF 114 to the LIPF 113 on ETSI X1 as illustrated by action 237.

As illustrated in FIG. 3c, in action 261, the ETSI X1 DeactivateTaskRequest message referring to a last "system info" Destination triggers the unsubscription of SIRF to NFInstance Notifications. That is, the action 265 by the SIRF 114 of removes the subscription and it may comprise, as illustrated in FIG. 3c, a sequence of transmissions by the SIRF 114 and the NRF 116 according to Nnrf_NFManagement. The response from the NRF 116 that the subscription has been removed may then be done through the DeactivateTaskResponse message transmitted by the SIRF 114 to the LIPF 113 on ETSI X1 as illustrated by action 267.

The SIRF 114 is able to determine that it has received the DeactivateTaskRequest message referring to the last "system info" Destination by keeping track of destination identifiers in the ActivateTaskRequest messages having Delivery Type="system info".

Finally, as illustrated by action 268, the procedure of terminating the subscription concludes in that the LIPF 113 and the SIRF 114 exchanges over the X1 interface, RemoveDestinationRequest and RemoveDestinationResponse messages with respect to the destination created in action 230.

The methods exemplified in FIG. 2e and FIG. 2h provide further examples of extensions to the X1 interface. Specifically, a new ETSI X1 CreateNFSubscriptionRequest message may be used to trigger the SIRF 114 to subscribe to NFinstanceNotification (for getting info about NF registration, update and de-registration). However, in contrast to the examples using the CreateDestinationRequest message, in the examples using such a new CreateNFSubscriptionRequest message, an initial sequence of CreateDestinationRequest and CreateDestinationResponse over X1 between the LIPF 113 and the SIRF 114 should be performed. That is, as illustrated in FIG. 3d, initially the SIRF 114, the LIPF 113 and the SIRF 114 exchanges over the X1 CreateDestinationRequest and CreateDestinationResponse messages as exemplified by action 240.

Once the SIRF 114 has received a first CreateNFSubscriptionRequest on ETSI X1 interface transmitted in action 241 from the LIPF 113, it determines (as exemplified in action 243) that it has been triggered to subscribe to NRF as NF service consumer using Nnrf_NFManagement as specified in the 3GPP standard specification 29.510 V16.2.0, handling the subscription data, acting on behalf of the LIPF 113.

The SIRF 114 is able to determine that it has received the first CreateNFSubscriptionRequest message by determining that it has not received a previous CreateNFSubscriptionRequest message. For example, such a determination may be done by the SIRF 114 by keeping track of destination identifiers in CreateNFSubscriptionRequest messages.

Figure 3D:
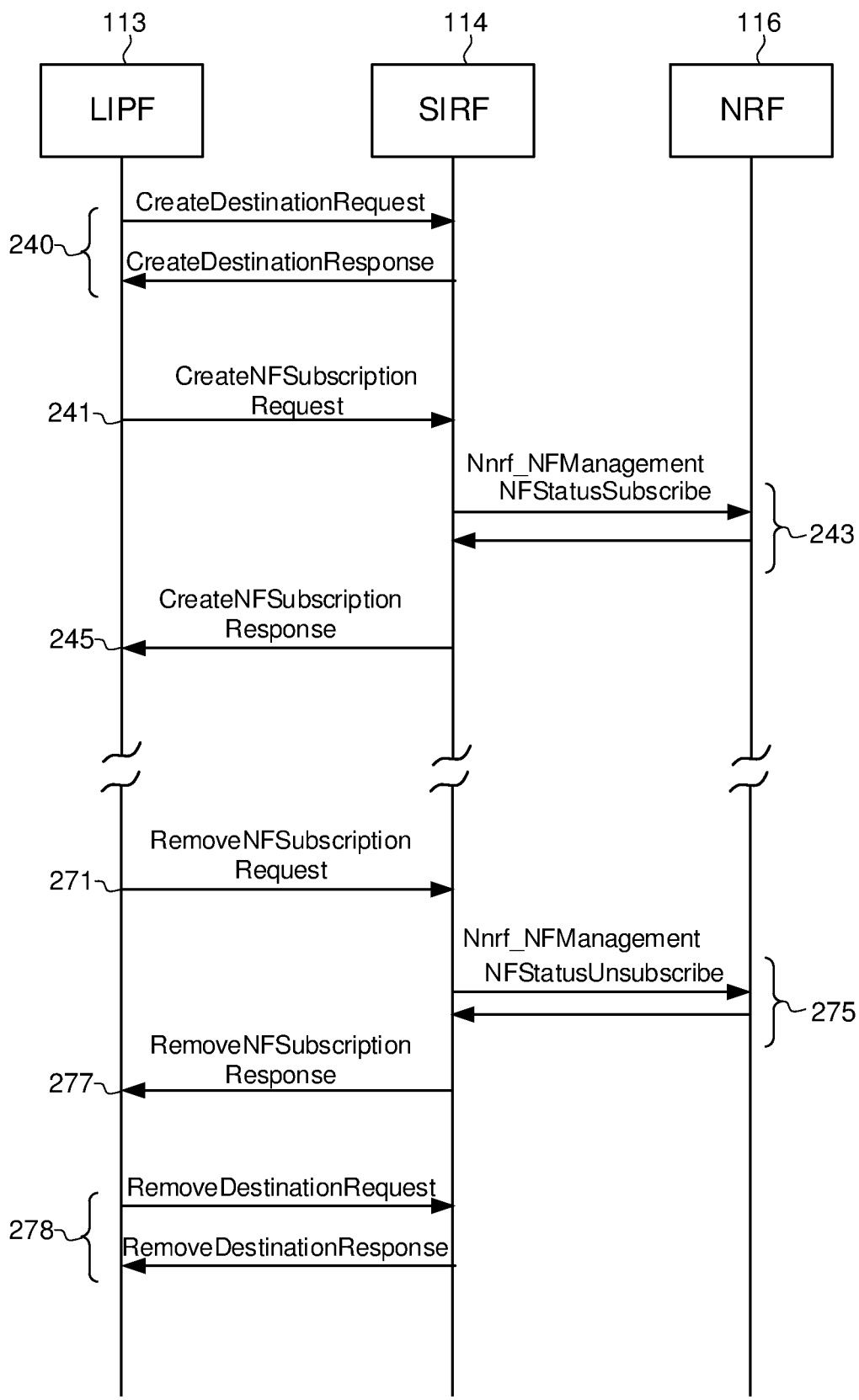
Figure 3E:
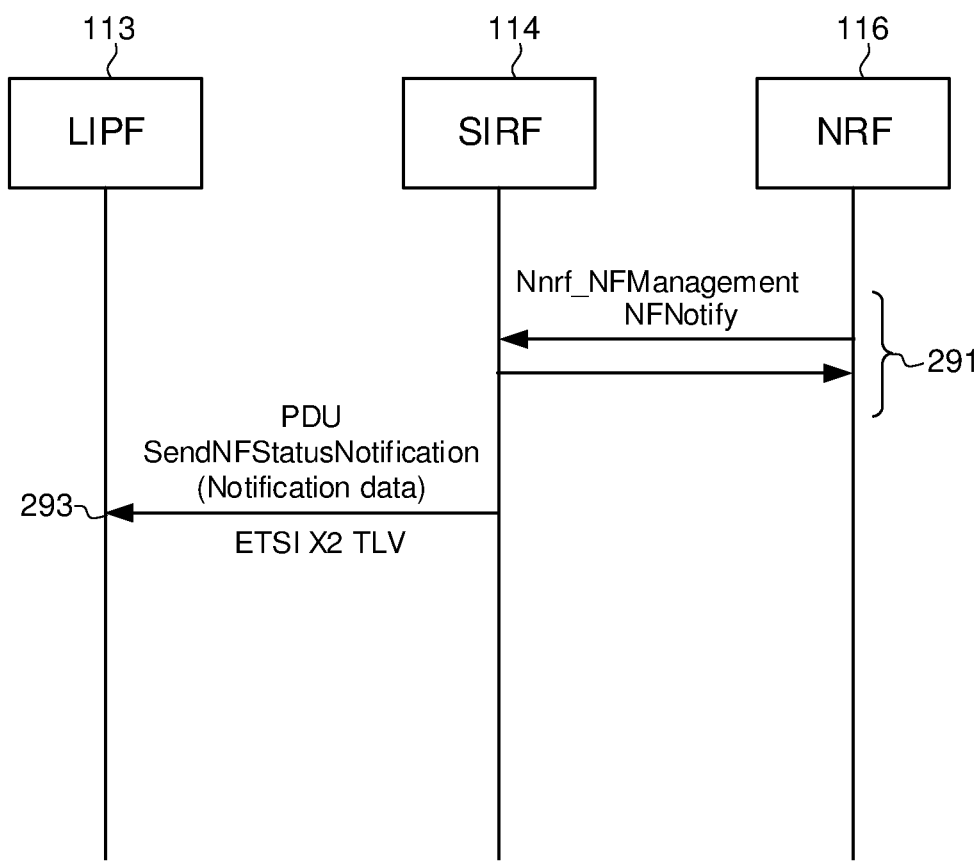

The action 245 by the SIRF 114 of obtaining, from the NRF 116, the subscription to receiving notifications of status changes of NF instances may comprise, as illustrated in FIG. 3d, a sequence of transmissions by the SIRF 114 and the NRF 116. The response from the NRF 116 (accepted or rejected subscription), may then be done through the CreateNFSubscriptionResponse message transmitted by the SIRF 114 to the LIPF 113 on ETSI X1 as illustrated by action 247.

As illustrated in FIG. 3d, in action 271, a new ETSI X1 RemoveNFSubscriptionRequest message triggers the unsubscription of SIRF to NFInstance Notifications. That is, reception of a last RemoveNFSubscriptionRequest message triggers the unsubscription. The action 275 by the SIRF 114 removes the subscription and it may comprise, as illustrated in FIG. 3d, a sequence of transmissions by the SIRF 114 and the NRF 116 according to Nnrf_NFManagement. The response from the NRF 116 that the subscription has been removed may then be done through a new RemoveNFSubscriptionRequest message transmitted by the SIRF 114 to the LIPF 113 on ETSI X1 as illustrated by action 277.

The SIRF 114 is able to determine that it has received the last RemoveNFSubscriptionRequest message by keeping track of destination identifiers in the CreateNFSubscriptionRequest messages.

Finally, as illustrated by action 278, the procedure of terminating the subscription concludes in that the LIPF 113 and the SIRF 114 exchanges over the X1 interface, RemoveDestinationRequest and RemoveDestinationResponse messages with respect to the destination created in action 240.

It is to be noted that the names CreateNFSubscriptionRequest, CreateNFSubscriptionRespponse, RemoveNFSubscriptionRequest and RemoveNFSubscriptionResponse are only examples that represent additions to the ETSI X1 specification and they may be exchanged with other suitable names other than names already specified in the standard specifications.

Figure 2J:
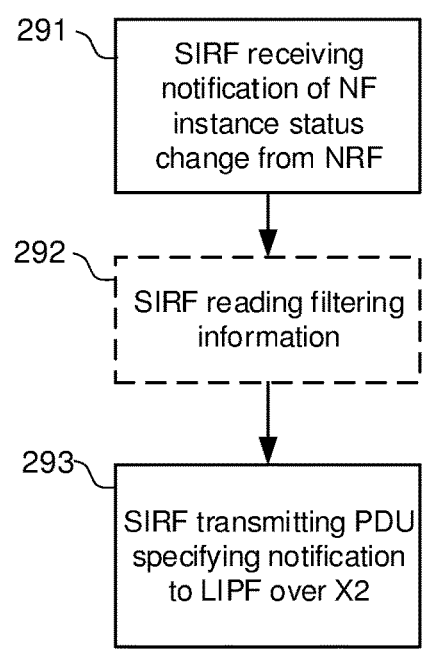

Turning now to FIG. 2j, actual reception of NF status change notifications, by the SIRF 114 from the NRF 116, and transmission by the SIRF 114 of the notifications to the LIPF 113 will be described in some more detail. Actions performed in such a procedure comprise:

Action 291

The SIRF 114 receives from the NRF 116, at least one notification of a status change of an NF instance.

Action 292

The SIRF 114 may in this optional action read filtering information that specifies how notifications of status changes of the NF instance are to be selected for transmission to the LIPF 113. The filtering information may comprise any of an identifier of an NF instance, NF instance type, NF instance status change type and NF instance profile information.

Action 293

The SIRF 114 transmits to the LIPF 113 over the X2 interface as specified in technical specification 103 221-2 V1.3.1 by the ETSI, a protocol data unit, PDU, that specifies the at least one notification of a status change of an NF instance. In case filtering information has been read by the SIRF, then the transmitting of the PDU in action 293 is performed depending on the filtering information.

In other words, once the NRF 116 has accepted the subscription notification from the SIRF 114 as described above, the notifications start being sent by the NRF 116 to the SIRF 114 that will forward them according to ETSI X2 specifications to the destination previously created through an ETSI X1 CreateDestination message, e.g. as exemplified above in connection with FIGS. 2c-e. This is exemplified illustrated in FIG. 3e by a sequence wherein the SIRF 114 and the NRF 116, in action 291, use the Nnrf_NFManagement as specified in the 3GPP standard specification 29.510 V16.2.0.

Using ETSI X2 interface to transport the NF status change notifications, the notifications being non-target related information, PDUs are transmitted from the SIRF 114 to the LIPF 113 as illustrated by action 293. The PDU Header Fields may be set as will be exemplified below.

The PDU that specifies the at least one notification of a status change of an NF instance may comprise
- an X1 identifier, XID, header field set to a value of zero or a valid task identifier,
- a payload direction header field set to a value of 5,
- a PDU type header field set to a value that is none of the integer values 1 to 4, for example it may be set to a value of 5,
- a correlation identity header field set to a value of zero, and
- a payload format header field set to a value that is none of the integer values 0 to 13, for example it may be set to a value of 14, and
- a payload field comprising at least one message having a Hypertext Transfer Protocol/2, HTTP/2, format.

That is, referring to 103 221-2 V1.3.1 by the ETSI, the XID field described in may be set to value 0 or a valid task identifier; the Payload direction field may be set to value 5, because the concept of direction is not applicable in this case of non-target related event; the PDU type may be enhanced in the related table with a new value 5 indicating "System Information"; the Correlation ID may be set to value 0, because correlation of the X2/X3 PDU is not applicable in the context of the present disclosure, i.e. non-target related events; the Payload format may be enhanced in the related table with a new value 14 indicating a new HTTP message format, permitted only on X2 and which details may enhance the X2 specification 103 221-2 V1.3.1 by the ETSI as follows:

A payload field containing an HTTP/2 message encoded as defined in the Internet Engineering Task Force (IETF) Request for Comments (RFC) 7540 and used as specified in clause 5 of 3GPP technical specification 29.500 V16.2.1. HTTP messages and bodies shall comply with the OpenAPI specification contained in Annex A of 3GPP technical specification 29.510 V16.2.0.

Figure 4:
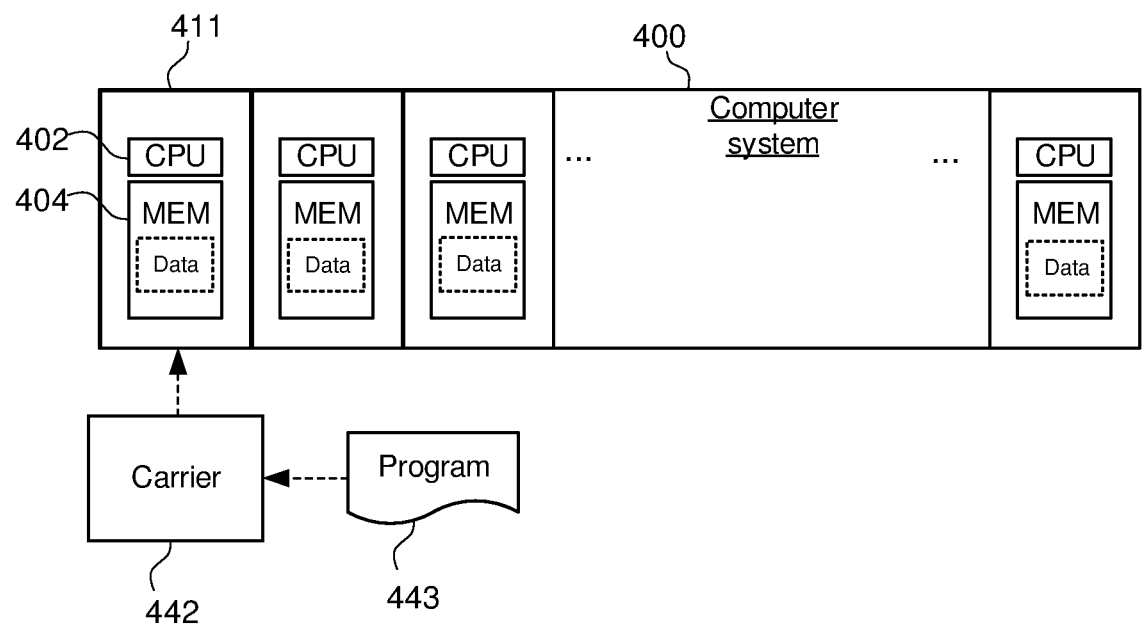

Continuing with reference to FIG. 4 and with continued reference to FIGS. 1-3, a computer system 400 will be described in some detail. The computer system 400, which may correspond to at least part of the telecommunication network 100, comprises at least a processor 402 and a memory 404, said memory 404 containing instructions executable by said processor 402 whereby said computer system 400 is operative to:
- obtain, by a lawful interception provisioning function, LIPF, from a system information retrieval function, SIRF, information pertaining to a network function, NF, that is an instance of a virtual network function, VNF, in a telecommunication network, where said information is unrelated to any lawful interception, LI, target associated with a point of intercept, POI, in the NF.

The computer system 400 may comprise one or more compute hosts 411, said one or more compute hosts 411 comprising at least a processor 402 and a memory 404.

The instructions that are executable by the processor 402 may be software in the form of a computer program 443 The computer program 443 may be contained in or by a carrier 442, which may provide the computer program 443 to the memory 404 and processor 402. The carrier 442 may be in any suitable form including an electronic signal, an optical signal, a radio signal or a computer readable storage medium.

In some embodiments, the computer system 400 is operative such that the obtaining information pertaining to a NF comprises receiving information pertaining to a plurality of NF instances.

In some embodiments, the computer system 400 is operative such that the obtaining information pertaining to a NF comprises:
- transmitting, from the LIPF to the SIRF over an X1 interface as specified in technical specification 103 221-1 V1.7.1 by the European Telecommunications Standards Institute, ETSI, a request that comprises a RequestMessageType having a value that indicates a request for information pertaining to a plurality of NF instances,
- obtaining, by the SIRF from a NF repository function, NRF, the information pertaining to a plurality of NF instances and comprising an identifier of each NF instance, and
- transmitting, from the SIRF to the LIPF over the X1 interface, a response that comprises the information pertaining to a plurality of NF instances.

In some embodiments, the computer system 400 is operative such that the obtaining information pertaining to a plurality of NF instances comprises obtaining profile information pertaining to each NF instance, and wherein the transmitting comprises transmitting the information pertaining to each NF instance.

In some embodiments, the computer system 400 is operative such that the obtaining information pertaining to a NF comprises obtaining a subscription to receiving notifications of status changes of at least one NF instance.

In some embodiments, the computer system 400 is operative such that the obtaining information pertaining to a NF comprises:
- transmitting, from the LIPF to the SIRF over an X1 interface as specified in technical specification 103 221-1 V1.7.1 by the ETSI, a CreateDestinationRequest message that comprises a DeliveryType having a value that indicates a request for the subscription to receiving notifications of status changes of NF instances,
- determining, by the SIRF based at least on the DeliveryType value, that a subscription to receiving notifications of status changes of NF instances is required by the LIPF,
- obtaining, by the SIRF from the NRF, the subscription to receiving notifications of status changes of NF instances, and
- transmitting, from the SIRF to the LIPF over the X1 interface, a
CreateDestinationResponse message comprising a positive acknowledgment of the obtained subscription.

In some embodiments, the computer system 400 is operative such that:
- the CreateDestinationRequest message comprises DestinationDetailsExtensions comprising filtering information that specifies how notifications of status changes of the NF instances are to be selected for transmission to the LIPF, and operative to:
- store, by the SIRF, the filtering information.

In some embodiments, the computer system 400 is operative such that the obtaining information pertaining to a NF comprises:
- transmitting, from the LIPF to the SIRF over an X1 interface as specified in technical specification 103

221-1 V1.7.1 by the ETSI, an ActivateTaskRequest message that comprises a DeliveryType having a value that indicates a request for the subscription to receiving notifications of status changes of NF instances, determining, by the SIRF 114 based at least on the DeliveryType value, that a subscription to receiving notifications of status changes of NF instances is required by the LIPF, obtaining, by the SIRF from the NRF, the subscription to receiving notifications of status changes of NF instances, and transmitting, from the SIRF to the LIPF over the X1 interface, a ActivateTaskResponse message comprising a positive acknowledgment of the obtained subscription.

In some embodiments, the computer system 400 is operative such that:

the ActivateTaskRequest message comprises TaskDetailsExtensions comprising filtering information that specifies how notifications of status changes of the NF instances are to be selected for transmission to the LIPF, and comprising storing, by the SIRF, the filtering information.

In some embodiments, the computer system 400 is operative such that the obtaining information pertaining to a NF comprises:

transmitting, from the LIPF to the SIRF over an X1 interface, as specified in technical specification 103 221-1 V1.7.1 by the ETSI, a CreateNFSubscriptionRequest message that indicates a request for the subscription to receiving notifications of status changes of NF instances, determining, by the SIRF based on the CreateNFSubscriptionRequest, that a subscription to receiving notifications of status changes of NF instances is required by the LIPF, obtaining, by the SIRF from the NRF, the subscription to receiving notifications of status changes of NF instances, and transmitting, from the SIRF to the LIPF over the X1 interface, a CreateNFSubscriptionResponse message comprising a positive acknowledgment of the received subscription.

In some embodiments, the computer system 400 is operative such that:

the CreateNFSubscriptionRequest message comprises CreateNFSubscriptionExtensions comprising filtering information that specifies how notifications of status changes of the NF instances are to be selected for transmission to the LIPF, and operative to:

store, by the SIRF, the filtering information.

In some embodiments, the computer system 400 of is operative such that the filtering information comprises any of:

an identifier of an NF instance,
NF instance type,
NF instance status change type, and
NF instance profile information.

In some embodiments, the computer system 400 is operative to:

transmit, from the LIPF to the SIRF over the X1 interface as specified in technical specification 103 221-1 V1.7.1 by the ETSI, a RemoveDestinationRequest message that comprises an identifier of a destination, determine, by the SIRF, based at least on the identifier of the destination in the RemoveDestinationRequest message that a subscription has been obtained, transmit, from the SIRF to the NRF, a request to delete the subscription, and transmit, from the SIRF to the LIPF over the X1 interface, a RemoveDestinationResponse message comprising a positive acknowledgment of the terminated subscription.

In some embodiments, the computer system 400 is operative to:

transmit, from the LIPF to the SIRF over an X1 interface as specified in technical specification 103 221-1 V1.7.1 by the ETSI, a DeactivateTaskRequest message that comprises a task identifier, determine, by the SIRF, based at least on the task identifier in the DeactivateTaskRequest message that a subscription has been obtained, transmit, from the SIRF to the NRF, a request to delete the subscription, and transmit, from the SIRF to the LIPF over the X1 interface, a DeactivateTaskResponse message comprising a positive acknowledgment of the terminated subscription.

In some embodiments, the computer system 400 is operative to:

transmit, from the LIPF to the SIRF over an X1 interface as specified in technical specification 103 221-1 V1.7.1 by the ETSI, a RemoveNFSubscriptionRequest message, determine, by the SIRF, based on the RemoveNFSubscriptionRequest message that a subscription has been obtained, transmit, from the SIRF to the NRF, a request to delete the subscription, and transmit, from the SIRF to the LIPF over the X1 interface, a RemoveNFSubscriptionResponse message comprising a positive acknowledgment of the terminated subscription.

In some embodiments, the computer system 400 is operative to:

transmit, from the LIPF to the SIRF over the X1 interface as specified in technical specification 103 221-1 V1.7.1 by the ETSI, any of a RemoveAllDestinationsRequest message, or
a DeactivateAllTasksRequest message, or
a RemoveAllNFSubscriptions message.

transmit, from the SIRF to the NRF, a request to delete all subscriptions to receiving notifications of status changes of NF instances, and transmit, from the SIRF to the LIPF over the X1 interface, a message comprising a positive acknowledgment of the terminated subscription.

In some embodiments, the computer system 400 is operative such that the obtaining information pertaining to a NF comprises receiving at least one notification of a status change of an NF instance.

In some embodiments, the computer system 400 is operative to:

receive, by the SIRF from the NRF, at least one notification of a status change of an NF instance, and transmit, from the SIRF to the LIPF over the X2 interface as specified in technical specification 103 221-2 V1.3.1 by the ETSI, a protocol data unit, PDU, that specifies the at least one notification of a status change of an NF instance.

In some embodiments, the computer system 400 is operative to:
read, by the SIRF, stored filtering information that specifies how notifications of status changes of the NF instance are to be selected for transmission to the LIPF, and operative such that:
the transmitting of the PDU is performed depending on the filtering information.

In some embodiments, the computer system 400 is operative such that the filtering information comprises any of:
an identifier of an NF instance,
NF instance type,
NF instance status change type, and
NF instance profile information.

In some embodiments, the computer system 400 is operative such that the PDU that specifies the at least one notification of a status change of an NF instance comprises:
an X1 identifier, XID, header field set to a value of zero or a valid task identifier,
a payload direction header field set to a value of 5,
a PDU type header field set to a value that is none of the integer values 1 to 4,
a correlation identity header field set to a value of zero, and
a payload format header field set to a value that is none of the integer values 0 to 13, and
a payload field comprising at least one message having a Hypertext Transfer Protocol/2, HTTP/2, format.

In some embodiments, the computer system 400 is operative such that:
the PDU type header field is set to a value that is 5, and the payload format header field is set to a value that is 14.

In some embodiments, the computer system 400 comprises one or more compute hosts 411, said one or more compute hosts 411 comprising at least a processor 402 and a memory 404.

Figure 5:
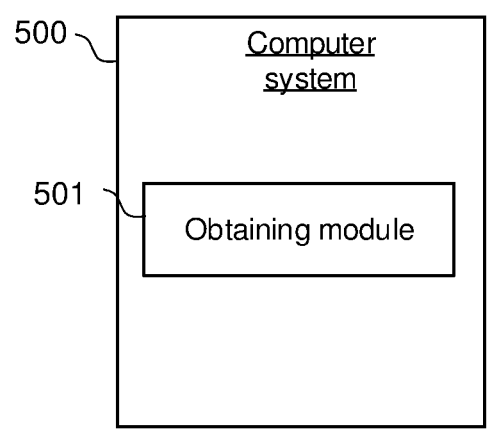

Turning now to FIG. 5, and with continued reference to FIGS. 1 to 4, a computer system 500 will be described in some detail. The computer system 500 comprises an obtaining module 501 configured to obtain, by a lawful interception provisioning function, LIPF, from a system information retrieval function, SIRF, information pertaining to a network function, NF, that is an instance of a virtual network function, VNF, in a telecommunication network, where said information is unrelated to any lawful interception, LI, target associated with a point of intercept, POI, in the NF.

The computer system 500 may comprise further modules that are configured to perform in a similar manner as, e.g., a computer system 400 described above in connection with FIG. 4.

The invention claimed is:

1. A method performed by a computer system in a telecommunication network, the computer system hosting at least a lawful interception provisioning function (LIPF) and a system information retrieval function (SIRF), the method comprising:
obtaining, by the LIPF from the SIRF, information pertaining to a network function (NF) that is an instance of a virtual network function (VNF) in the telecommunication network, wherein the information is unrelated to any lawful interception (LI) target associated with a point of intercept (POI) in the NF, wherein the obtaining information pertaining to a NF comprises:
transmitting, from the LIPF to the SIRF over an X1 interface, a request that comprises a RequestMessageType having a value that indicates a request for information pertaining to a plurality of NF instances;
obtaining, by the SIRF from a NF repository function (NRF) the information pertaining to a plurality of NF instances and comprising an identifier of each NF instance; and
transmitting, from the SIRF to the LIPF over the X1 interface, a response that comprises the information pertaining to a plurality of NF instances.

2. The method of claim 1, wherein the obtaining information pertaining to a plurality of NF instances comprises obtaining profile information pertaining to each NF instance, and wherein the transmitting comprises transmitting the information pertaining to each NF instance.

3. The method of claim 1, wherein the obtaining information pertaining to a NF comprises obtaining a subscription to receiving notifications of status changes of at least one NF instance.

4. The method of claim 3, wherein the obtaining information pertaining to a NF comprises:
transmitting, from the LIPF to the SIRF over the X1 interface, a CreateDestinationRequest message that comprises a DeliveryType having a value that indicates a request for the subscription to receiving notifications of status changes of NF instances,
determining, by the SIRF based at least on the DeliveryType value, that a subscription to receiving notifications of status changes of NF instances is required by the LIPF,
obtaining, by the SIRF from the NRF, the subscription to receiving notifications of status changes of NF instances, and
transmitting, from the SIRF to the LIPF over the X1 interface, a CreateDestinationResponse message comprising a positive acknowledgment of the obtained subscription.

5. The method of claim 4, comprising:
transmitting, from the LIPF to the SIRF over the X1 interface, a RemoveDestinationRequest message that comprises an identifier of a destination,
determining, by the SIRF, based at least on the identifier of the destination in the RemoveDestinationRequest message that a subscription has been obtained,
transmitting, from the SIRF to the NRF, a request to delete the subscription, and
transmitting, from the SIRF to the LIPF over the X1 interface, a RemoveDestinationResponse message comprising a positive acknowledgment of the terminated subscription.

6. The method of claim 4, wherein
the CreateDestinationRequest message comprises DestinationDetailsExtensions comprising filtering information that specifies how notifications of status changes of the NF instances are to be selected for transmission to the LIPF, and comprising:
storing, by the SIRF, the filtering information.

7. The method of claim 6, wherein the filtering information comprises:
an identifier of an NF instance,
NF instance type,
NF instance status change type, and/or
NF instance profile information.

8. The method of claim 3, wherein the obtaining information pertaining to a NF comprises:
transmitting, from the LIPF to the SIRF over the X1 interface, an ActivateTaskRequest message that comprises a DeliveryType having a value that indicates a request for the subscription to receiving notifications of status changes of NF instances, determining, by the SIRF based at least on the DeliveryType value, that a subscription to receiving notifications of status changes of NF instances is required by the LIPF, obtaining, by the SIRF from the NRF, the subscription to receiving notifications of status changes of NF instances, and transmitting, from the SIRF to the LIPF over the X1 interface, a ActivateTaskResponse message comprising a positive acknowledgment of the obtained subscription.

9. The method of claim 8, wherein t he ActivateTaskRequest message comprises TaskDetailsExtensions comprising filtering information that specifies how notifications of status changes of the NF instances are to be selected for transmission to the LIPF, and the method further comprisesstoring, by the SIRF, the filtering information.

10. The method of claim 8, comprising:

transmitting, from the LIPF to the SIRF over the X1 interface, a DeactivateTaskRequest message that comprises a task identifier, determining, by the SIRF, based at least on the task identifier in the DeactivateTaskRequest message that a subscription has been obtained, transmitting, from the SIRF to the NRF, a request to delete the subscription, and transmitting, from the SIRF to the LIPF over the X1 interface, a DeactivateTaskResponse message comprising a positive acknowledgment of the terminated subscription.

11. The method of claim 3, wherein the obtaining information pertaining to a NF comprises:

transmitting, from the LIPF to the SIRF over the X1 interface, a CreateNFSubscriptionRequest message that indicates a request for the subscription to receiving notifications of status changes of NF instances, determining, by the SIRF based on the CreateNFSubscriptionRequest, that a subscription to receiving notifications of status changes of NF instances is required by the LIPF, obtaining, by the SIRF from the NRF, the subscription to receiving notifications of status changes of NF instances, and transmitting, from the SIRF to the LIPF over the X1 interface, a CreateNFSubscriptionResponse message comprising a positive acknowledgment of the received subscription.

12. The method of claim 11, wherein:

the CreateNFSubscriptionRequest message comprises CreateNFSubscriptionExtensions comprising filtering information that specifies how notifications of status changes of the NF instances are to be selected for transmission to the LIPF, and the method further comprises storing, by the SIRF, the filtering information.

13. The method of claim 11, comprising:

transmitting, from the LIPF to the SIRF over the X1 interface, a RemoveNFSubscriptionRequest message, determining, by the SIRF, based on the RemoveNFSubscriptionRequest message that a subscription has been obtained, transmitting, from the SIRF to the NRF, a request to delete the subscription, and transmitting, from the SIRF to the LIPF over the X1 interface, a RemoveNFSubscriptionResponse message comprising a positive acknowledgment of the terminated subscription.

14. The method of claim 3, comprising:

transmitting, from the LIPF to the SIRF over the X1 interface, a RemoveAllDestinationsRequest message, a DeactivateAllTasksRequest message, and/or a RemoveAllNFSubscriptions message;

transmitting, from the SIRF to the NRF, a request to delete all subscriptions to receiving notifications of status changes of NF instances; and transmitting, from the SIRF to the LIPF over the X1 interface, a message comprising a positive acknowledgment of the terminated subscription.

15. The method of claim 3, wherein the obtaining information pertaining to a NF comprises receiving at least one notification of a status change of an NF instance.

16. The method of claim 15, comprising:

receiving, by the SIRF from the NRF, at least one notification of a status change of an NF instance, and transmitting, from the SIRF to the LIPF over an X2 interface, a protocol data unit (PDU) that specifies the at least one notification of a status change of an NF instance.

17. The method of claim 16, comprising:

reading, by the SIRF, stored filtering information that specifies how notifications of status changes of the NF instance are to be selected for transmission to the LIPF, wherein the transmitting of the PDU is performed depending on the filtering information.

18. The method of claim 17, wherein the filtering information comprises:

an identifier of an NF instance,

NF instance type,

NF instance status change type, and/or

NF instance profile information.

19. The method of claim 16, wherein the PDU that specifies the at least one notification of a status change of an NF instance comprises:

an X1 identifier, XID, header field set to a value of zero or a valid task identifier, a payload direction header field set to a value of 5, a PDU type header field set to a value that is none of the integer values 1 to 4, a correlation identity header field set to a value of zero, a payload format header field set to a value that is none of the integer values 0 to 13, and a payload field comprising at least one message having a Hypertext Transfer Protocol/2, HTTP/2, format.

20. A computer system comprising processing circuitry, comprising at least one processor, and a memory, the memory containing instructions, executable by the processing circuitry, for configuring the computer system to:

obtain, by a lawful interception provisioning function (LIPF) from a system information retrieval function (SIRF) over an X1 interface, information pertaining to a network function (NF) that is an instance of a virtual network function (VNF) in a telecommunication network, where the information is unrelated to any lawful interception (LI) target associated with a point of intercept (POI) in the NF, wherein the obtaining information pertaining to a NF comprises:

transmitting, from the LIPF to the SIRF over the X1 interface, a request that comprises a RequestMessageType having a value that indicates a request for information pertaining to a plurality of NF instances, obtaining, by the SIRF from the NRF, the information pertaining to a plurality of NF instances and comprising an identifier of each NF instance, and transmitting, from the SIRF to the LIPF over the X1 interface, a response comprising the information pertaining to a plurality of NF instances.

\* \* \* \* \*